United States Patent
Garg et al.

(10) Patent No.: US 9,471,615 B2
(45) Date of Patent: Oct. 18, 2016

(54) ENHANCING CONTENT MEDIATED ENGAGEMENT

(71) Applicant: KiCube, Inc., Austin, TX (US)

(72) Inventors: Manish Garg, Bangalore (IN); Avinash Birnale, Bangalore (IN); Vikram Chadaga, Bangalore (IN); Ajay Gabale, Bangalore (IN); Dwarakanathan L N, Bangalore (IN)

(73) Assignee: BRANDIFICANT INC., Wilmington, DE (US)

( * ) Notice: Subject to any disclaimer, the term of this patent is extended or adjusted under 35 U.S.C. 154(b) by 0 days.

(21) Appl. No.: 13/910,167

(22) Filed: Jun. 5, 2013

(65) Prior Publication Data

US 2013/0332425 A1 Dec. 12, 2013

(51) Int. Cl.
*G06F 17/30* (2006.01)
*G06Q 10/10* (2012.01)

(52) U.S. Cl.
CPC ......... *G06F 17/30345* (2013.01); *G06Q 10/10* (2013.01)

(58) Field of Classification Search
CPC .. G06Q 10/10; G06Q 10/101; G06Q 10/103; G06F 17/30345
USPC ....... 715/730, 731, 732, 738, 739, 810, 835, 715/847; 707/608
See application file for complete search history.

(56) References Cited

U.S. PATENT DOCUMENTS

| | | | | |
|---|---|---|---|---|
| 5,983,277 | A | * | 11/1999 | Heile et al. ................... 709/232 |
| 9,053,189 | B2 | * | 6/2015 | Hoag ................ G06F 17/30867 |
| 2003/0048291 | A1 | * | 3/2003 | Dieberger ..................... 345/732 |
| 2005/0108619 | A1 | * | 5/2005 | Theall et al. ................. 715/500 |
| 2007/0083536 | A1 | * | 4/2007 | Darnell et al. ................ 707/101 |
| 2009/0265416 | A1 | * | 10/2009 | Svendsen et al. ............ 709/203 |
| 2010/0031152 | A1 | * | 2/2010 | Villaron et al. .............. 715/731 |
| 2010/0037140 | A1 | * | 2/2010 | Penner et al. ................ 715/732 |
| 2010/0125882 | A1 | * | 5/2010 | Athias ............................. 725/88 |
| 2010/0251094 | A1 | * | 9/2010 | Holm et al. .................. 715/230 |
| 2010/0259559 | A1 | * | 10/2010 | Schneider ..................... 345/629 |
| 2011/0191684 | A1 | * | 8/2011 | Greenberg .................... 715/719 |
| 2012/0084656 | A1 | * | 4/2012 | Garroch ........................ 715/732 |
| 2013/0061135 | A1 | * | 3/2013 | Reinders ........... G06F 17/30867 715/255 |
| 2014/0337734 | A1 | * | 11/2014 | Bradford ................ G06Q 10/00 715/719 |

* cited by examiner

*Primary Examiner* — Christyann Pulliam
*Assistant Examiner* — Jedidiah Ferrer
(74) *Attorney, Agent, or Firm* — Mainline Intellectual Property; Syam Anand

(57) ABSTRACT

According to an aspect of the present invention, a content server enhances content mediated engagements, by first enabling a user to specify a content collection containing a set of contents according to a specific/desired sequence, and then storing a data indicating the collection. The set of contents are selected from contents (or portions thereof) maintained in a repository. In response to receiving during a content mediated engagement, a request of the stored content collection, the content server then provides the set of contents according to the specific sequence. The content server also facilitates the same content (maintained in repository) to be included and accordingly provided as part of different content collections.

16 Claims, 17 Drawing Sheets

```
?([{
  "status": true,
  "statusCode": null,
  "responseData": [{
51a→ "chapterName": "Images",
      "chapterPageDetails": [{
        "mediaType": "jpg",
        "mediaName": "1.1 Front View.jpg",     51a→
        "mediaId": 7792
      },{
        "mediaType": "jpg",
        "mediaName": "1.2 Perspective Small.jpg",
        "mediaId": 7794
      },{
        "mediaType": "HOTSPOT",
        "mediaName": null,
        "mediaId": 7821
      }]
    },{
52a→ "chapterName": "Details",
      "chapterPageDetails": [{
        "mediaType": "pdf",
        "mediaName": "2.1 CAR Features.pdf",
        "mediaId": 7611
      },{
        "mediaType": "URL",
        "mediaName": "http://www.acmecars.com/",
        "mediaId": 7612
      },{...
      }]
    },{...
  }]
})
```

*FIG. 5A*

```
?([{
  "status": true,
  "statusCode": null,
  "responseData": {
    "mediaType": "custommedia",
    "mediaName": "CAR Family",
    "mediaId": 7821,
    "positionDict": {
      "1": {
        "popoverSize": "1",
        "y": "570",
        "x": "876"
      }
    },
    "mediaIds": null,
    "backGroundMediaId": 7794,
    "mediaList": {
      "1": {
        "7796": ["1.3 Interiors.jpg","jpg"]
      }
    }
  }
})
```

*FIG. 5B*

| | | | | Admin | |
|---|---|---|---|---|---|
| Perspective | | | | | |

Preview | Notes | Download Media

| Notes | | DELETE | DELETE ALL NOTES |
|---|---|---|---|
| | Commented By | Posted On | |
| ▼ Drop Note | | | |
| Sports Convertible | Scott | 1 Sep, 2012 3:25 PM ←77 | |

76

About   Blog   FAQs   Terms   Contact

*FIG. 7C*

ENHANCING CONTENT MEDIATED ENGAGEMENT

BACKGROUND OF THE INVENTION

1. Technical Field

The present disclosure relates to content management systems and more specifically to enhancing content mediated interaction and engagement.

2. Related Art

Content refers to information that is delivered to end-users and which may provide value for such end-users. Content may be delivered in any convenient form, such as printed material, electronic format, etc. In the disclosure herein, the word "content" is used to refer to electronically delivered content such as information stored in an electronic form and later displayed using an electronic display device.

Such content (and delivery/exchange thereof) is often the basis for achieving human engagement. For example, a sales engagement between a prospective customer and a sales person is typically based on exchange of information/content on the parties involved in the engagement, on the products or services being offered, on the agreements to be signed, etc. Similarly, a student-teacher engagement may be based on exchange of course content. Such an engagement based on delivery/exchange of content is commonly referred to as "content mediated engagement".

There is a general need to enhance the content mediated engagements, in particular, to enhance the generation and delivery of content in such engagements.

SUMMARY OF THE INVENTION

According to an aspect of the present invention, a content server enhances content mediated engagements, by first enabling a user to specify a content collection containing a set of contents according to a specific/desired sequence, and then storing a data indicating the collection. The set of contents are selected from contents (or portions thereof) maintained in a repository. In response to receiving during a content mediated engagement, a request of the stored content collection, the content server then provides the set of contents according to the specific sequence. The content server also facilitates the same content (maintained in repository) to be included and accordingly provided as part of different content collections.

Thus, end-users are enabled to create and provide different content collections using the (standard) set of contents maintained in a common repository. The standard set of content may be developed by content developers (different from the end-users), thereby ensuring the quality and consistency of the contents delivered during content mediated engagements.

According to another aspect of the present invention, a content server facilitates a content developer to control the rights of the end-users (specifying the content collections). Thus, in response to an indication from the content developer that a standard content cannot be modified by a specific user, the content server ensures that only the standard content is provided when the specific user includes the content in a content collection. Alternatively, for example, in the absence of such an indication, the content server enables the specific user to modify the standard content (for example, to select desired pages from all the pages of the standard content) to form a modified content as part of the content collection. The content server then provides only the modified content (selected pages) in response to a request for the content collection.

In one embodiment, the content server (noted above) provides a requested content collection as one or more of (a) sending a link to the content collection such that a set of contents (specified as part the content collection) is displayed in response to a user selecting the sent link; (b) sending the content collection according to a pre-defined format and a player capable of playing the pre-defined format such that the set of contents is displayed when a user views the content collection using the player; and (c) sending the set of contents forming the content collection as a single document (in a format) that can be viewed on a device used by a user.

According to one more aspect of the present invention, the end-users requesting the content collections are enabled to provide corresponding feedback on the requested content collection, in particular, on each of the contents included in the requested content collection. A content server, upon receiving such feedback from different users, stores the received feedback associated with the individual contents in a repository. The content server then provides the stored feedback to content developers, thereby enabling the content developers to assess the quality of each of the contents in enhancing content mediated engagements.

According to yet another aspect of the present invention, a content server enables a user specifying a content collection, to also specify sub-sequences of the sequence of contents in the content collection. Each sub-sequence represents a subset of content that are to be provided (to the end-users) before provided contents corresponding to another (for example, next or previous) sub-sequence specified in the sequence. The content server then ensures that the corresponding subset of contents of a sub-sequence is provided before providing contents of another sub-sequence. The content server also facilitates the user to specify a first set of navigation links for navigating among the contents of a sub-sequence and a second set of navigation links for navigating among the various sub-sequences specified in the sequence. Furthermore, the content server also enable the user to specify a first transition effect between a pair of contents in a sub-sequence and a second transition effect between a pair of sub-sequences.

According to an aspect of the present invention, a content server provides (to the end-users) the sub-sequence and the contents corresponding to each sub-sequence as two different dimensions of a multi-dimensional display. The first set of navigation links are displayed along a first dimension corresponding to the contents of each sub-sequence, while the second set of navigation links are displayed along a second dimension corresponding to the different sub-sequences. The content server also provides the first transition effect when transitioning from one of the pair of contents to the other of the pair of contents according to said first sequence, and the second transition effect when transitioning from one of the pair of sub-sequences to the other of the pair of sub-sequences.

According to another aspect of the present invention, a content server receives from a user, a first location in a first content and a second content to be associated with the first location, and then stores an association between the first location in the first content and the second content in a repository. In response to a request from a user, for a content collection containing the first content, the content server displays (on a display unit) the first content and an indication at the first location indicating an association (of the first location) with another content. Upon the user providing an input indicating that the first location is selected, the content server then provides the second content based on the stored association between the first location and the second content.

Several aspects of the invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

BRIEF DESCRIPTION OF THE DRAWINGS

Example embodiments of the present invention will be described with reference to the accompanying drawings briefly described below.

FIG. 5A depicts portions of the data corresponding to a user-specified content collection in one embodiment.

FIG. 5B depicts portions of the data corresponding to hotspots specified for a content collection in one embodiment.

FIG. 7C illustrates the manner in which content developers/collection creators are enabled to view feedback provided by end-users/sales persons in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Example Environment

Figure 1:
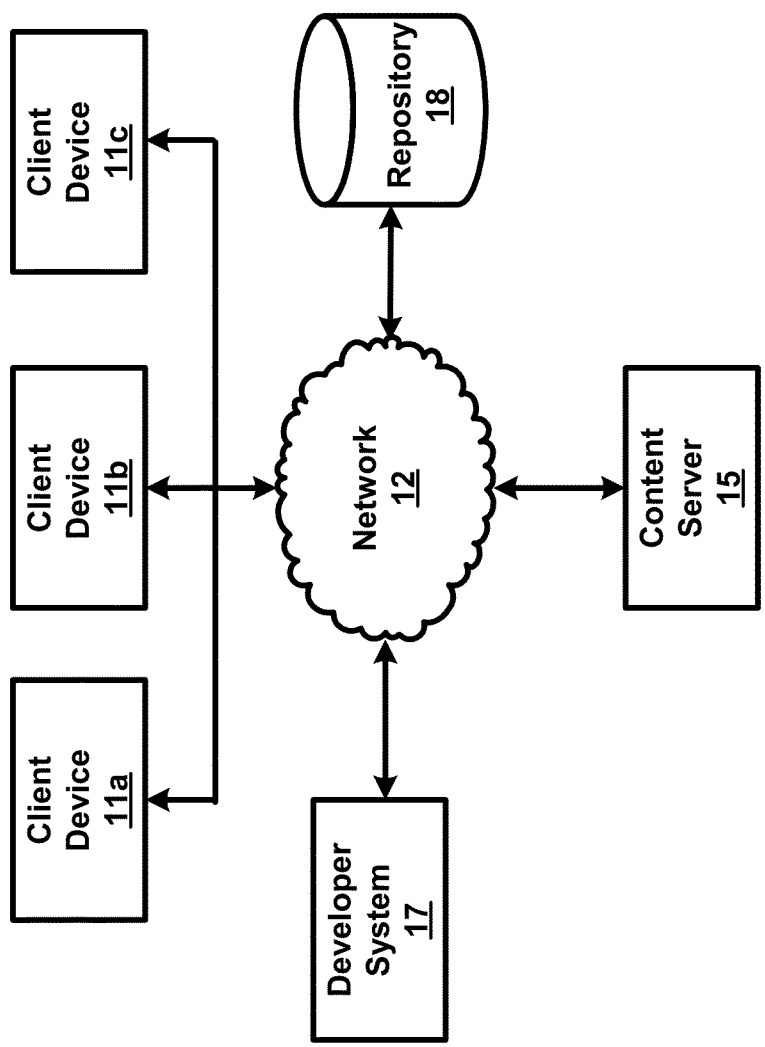
FIG. 1 is a block diagram illustrating an example environment in which various aspects of the present invention can be implemented.

FIG. 1 is a block diagram illustrating an example environment in which various aspects of the present invention can be implemented. The block diagram is shown containing client devices 11a-11c, network 12, content server 15, developer system 17 and repository 18. Merely for illustration, only representative number/type of systems is shown in FIG. 1. Many computing systems often contain many more systems, both in number and type, depending on the purpose for which the computing system is designed. Each system/device of FIG. 1 is described below in further detail.

Network 12 provides connectivity between client devices 11a-11c, content server 15, developer system 17 and repository 18. Network 12 may represent Wireless/LAN networks implemented using protocols such as Transport Control Protocol/Internet Protocol (TCP/IP), or circuit switched network implemented using protocols such as GSM, CDMA, etc. as is well known in the relevant arts.

In general, network 12 provides transport of packets, with each packet containing a source address (as assigned to the specific system from which the packet originates) and a destination address, equaling the specific address assigned to the specific system to which a packet is destined/targeted. The packets would generally contain the requests and responses between the client devices 11a-11c, content server 15 and developer system 17 as described below.

Repository 18 represents a non-volatile storage, facilitating storage and retrieval of a collection of data by (applications executing in) client devices 11a-11c or content server 15. Repository 18 may maintain information such as portions of the content of interest, the details of the access rights of the developers/end-users for each of the portions of the content, the type and data corresponding to each content, etc. Repository 18 may be implemented using relational database technologies and provide storage and retrieval of data using structured queries such as SQL (Structured Query Language), as is well known in the relevant arts.

In one embodiment described below, repository 18 is implemented as a file server and stores data in the form of one or more files organized in the form of a hierarchy of directories, as is well known in the relevant arts. Accordingly, the content (or portions thereof) may be a text/visual presentation file according to Microsoft™ Powerpoint presentation (PPT) or Adobe Portable Document Format (PDF), a text/visual document/file according to Microsoft™ Word (DOC), video/animation file in various formats such as MPEG, MP4 etc. or an audio file in various formats such as WAV, MP3, etc. as is well known in the relevant arts.

It may be appreciated that each of the contents (or portion thereof) stored in repository 18 may be accessed directly (by sending appropriate requests over network 12 to repository 18) by one of client devices 11a-11c and developer system 17. Alternatively, a client device/developer system may send appropriate requests (over network 12) directed to content server 15, the requests indicating the desired contents sought to be accessed. Content server 15 then accesses (retrieves) the desired contents from repository 18 and then provides the retrieved content as a response to the requesting client device/developer system. In such an alternative embodiment, client devices/developer system are required to perform any modifications to the contents in repository 18 by sending appropriate requests to content server 15.

Each of client devices 11a-11c and developer system 17 represents a system such as a personal computer, workstation, mobile phones (e.g. iPhone available from Apple Corporation), tablets, portable devices (also referred to as "smart" devices") that operate with a generic operating system such as Android operating system available from Google Corporation, etc., used by users to send (client) requests to content server 15 (or to access content directly from repository 18).

The client requests may be sent by content developers from developer system 17 for creation of new content, for editing/removing existing portions of content, and/or for modifying the access rights associated with one of the content of interest stored in repository 18. Alternatively, the client requests may be sent by end-users using one of client devices 11a-11c for accessing various portions of content stored in repository 18. The client requests may be generated using appropriate user interfaces. In general, a client device enables a user to send client requests for performing desired tasks to content server 15 and to receive corresponding responses containing the results of performance of the requested tasks.

Content server 15 represents a system, such as a web and/or application server, executing various software applications designed to perform tasks (such as creating/editing content, accessing content, etc.) requested by users using client devices 11a-11c and developer system 17. The applications may perform the tasks using data maintained internally (e.g., within content server 15), on external data (e.g. maintained in repository 18) or on data received along with the request (e.g., data provided by the end-user/developer). Content server 15 may then send the results of performance of the tasks as corresponding responses to the requesting client device 11a-11c or developer system 17.

It may be appreciated that some of the systems of FIG. 1 may be used during content mediated engagements for delivery/exchange of content, as described below with examples.

2. Sample Content Mediated Engagements

In a sales engagement, sales persons using client devices 11a-11c may engage prospective customers through a series of meetings and exchange of content. Though the products/offerings from the business entity may be same for all customers, the sales pitch used for each prospective customer is generally unique. Accordingly, the end-user/sales person typically customizes and/or adds new information to the content (in the form of various documents/files maintained separately) available from the business entity, based on the prospective customer sought to be engaged.

However there are several drawbacks with the above noted approach. For example, the business entity offering the products/services may wish to ensure that each of the prospective customers is receiving standard content, authored by developers and not the end-users/sales person. In addition, the end-users/sales persons may still be enabled to create unique customer specific sales pitches, while keeping the integrity of the standard content.

Furthermore, the business entity may wish to track the status of the engagement, in particular, the impact of the content provided on the outcome of the engagement. Some prior systems such as a CRM (Customer Relationship Management) system may help in tracking engagements to some degree, for example, knowing the dates of meeting with the customer or capturing general comments (not specific to the contents provided) from the customer. However, a business entity may wish to track all the contents that were distributed to customers, the feedback from the customers on the provided specific contents, the overall status of the various engagements and co-relate the contents distributed with the feedback/status.

In a student-teacher engagement, the content provided is commonly specific to a class or subject and is rarely specific to the (requirements of the) student. While such content may be sufficient for class oriented environment, this is insufficient for targeted teaching (home tutoring or online tutoring or small group coaching or students with disability, etc.) context where it may be necessary for the teacher to provide content targeted to the students or groups (using client devices 11a-11c). The teacher may also wish to track such targeted engagements.

In a doctor-patient engagement, a doctor may wish to provide content (using one of client devices 11a-11c) on a disease that a patient may be suffering from, on a medicine, or surgical process that may be involved in the treating the disease so as to provide guidance to the patient. Such content may need to be provided specific to each patient, as different patients may be suffering the same disease at different levels. The doctor may also wish to track the effectiveness of the content provided during such engagements.

Content server 15 provided/extended according to several aspects of the present invention enhances content mediated engagements, while overcoming at least some of the drawbacks noted above. The manner in which content server 15 enhances content mediated engagements is described below with examples.

3. Enhancing Content Mediated Engagements

Figure 2:
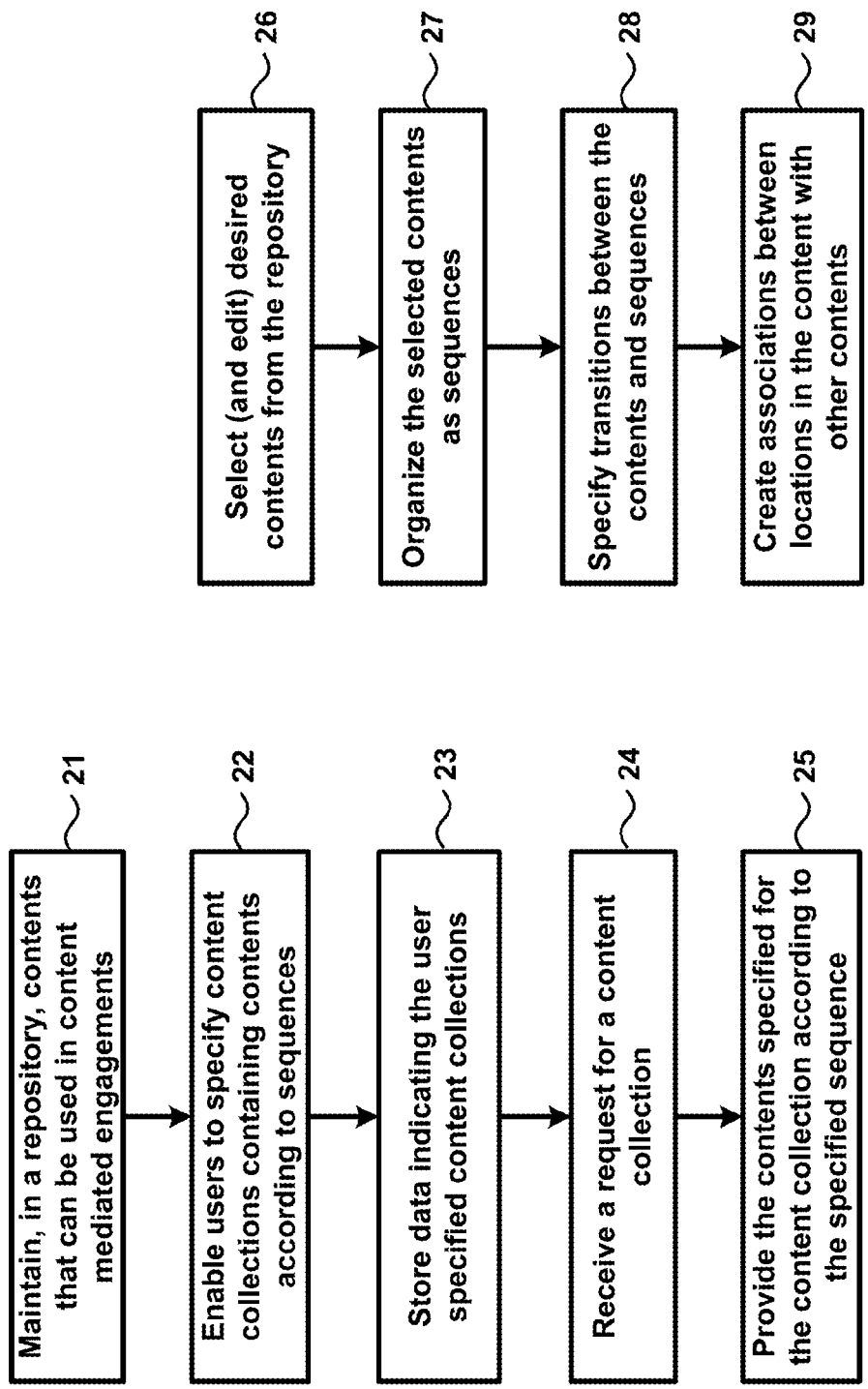
FIG. 2A is a flow chart illustrating the manner in which a content mediated engagement enhanced according to an aspect of the present invention.
FIG. 2B is a flow chart illustrating the manner in which a user in enabled to create a content collection according to an aspect of the present invention.

FIG. 2A is a flow chart illustrating the manner in which a content mediated engagement enhanced according to an aspect of the present invention. The flowchart is described with respect to FIG. 1, in particular, content server 15 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention.

In step 21, content server 15 maintains, in repository (e.g. 18), contents that can be used in content mediated engagements. The contents may be maintained in the form of one or more documents/files, in the scenario that the repository is implemented as a file server. The contents may be received from a developer (using developer system 17), and then stored in the repository in response to such receiving. By having a repository of contents, content developers are enabled to provide standard content that are to be used by end-users.

In step 22, content server 15 enables end-users (such as sales persons using client devices 11*a*-11*c*) to specify content collections containing corresponding sets of contents according to desired sequences. Each content collection contains one or more contents from repository 18 (either in the standard form or modified by the user), arranged according to a user specified sequences. The manner in which an end-user creates a new content collection is described below with respect to FIG. 2B.

In step 23, content server 15 stores data indicating the user specified content collections in a non-volatile storage such as repository 18. The data may indicate the specific contents specified by the user in addition to preferences (such as sub-sequences, transitions, location associations, etc. described in detail below) specified by the user for each content collection. The data may be stored in any convenient format, such as according to extended markup language (XML).

In step 24, content server 15 receives a request for a content collection. The request may be received from the same user (who specified the collection) or another user using one of client devices 11*a*-11*c*. The request may indicate an identifier/name of the content collection as stored in repository 18.

In step 25, content server 15 provides the contents specified for the requested content collection as a response to the request. The contents are provided according to the user specified sequence (and other preferences) stored in step 23. The standard contents provided by content developers and stored in repository 18 may be provided as such, in response to the request.

The contents may be provided to the requesting user in a known way. For example, a link such as a Universal Resource Locator (URL) to the requested content collection may be provided as a response to the end-user. The specific contents forming the content collection may then be displayed (on a display unit associated with the requesting client device) in response to the end-user selecting the link. In another embodiment, the requested content collection is sent in a pre-defined format along with a player capable of displaying the collection in the pre-defined format. In yet another embodiment, the content may be sent as a single document/file in a format that can be viewed directly on a device used by the end-user.

Thus, by providing the users a repository of contents from which to create, share and view desired content collections, content server 15 enhances the content mediated engagements such as those noted above. Content server 15 may also receive feedbacks (from the end-users or customers) on the provided contents and store such feedback in repository 18. The feedbacks may be later used by content developers to assess the quality of the previously specified content collections and to refine/modify the contents maintained in repository 18 based on such assessment.

It may be appreciated that content collections may be specified once by the end-users and later modified by other users according to the requirements of the engagement (for example, the sales pitch specific to the potential customer, as noted above). The manner in which content server 15 enables an end-user to create a new (and to modify an existing) content collection is described below with examples.

4. Enabling Creation of a Content Collection

FIG. 2B is a flow chart illustrating the manner in which a user in enabled to create (and/or modify) a content collection according to an aspect of the present invention. The flowchart is described with respect to FIG. 1, in particular, content server 15 merely for illustration. Also, it is assumed that the steps of FIG. 2B are performed in response to requests received from an end-user using client device 11*a*. However, various features can be implemented in other environments (e.g. when the requests are received from other client devices) also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention.

In step 26, content server 15 facilitates an end-user (in response to requests received) to select (and edit) desired contents from repository 18. As noted above, the contents stored in repository 18 may be standard contents provided by content developers using developer systems 17. The selected contents may be edited by the end user before inclusion in the content collection. For example, in a scenario that a content is a document containing multiple pages, the end-user may select only a desired subset of the pages to be included as content in the content collection.

In step 27, content server 15 facilitates an end-user to organize the selected contents as one or more sequences. In general, the end-user specifies an overall/top-level sequence for all the contents, the top-level sequence indicating the order in which the selected contents included in the content collection are to be provided to the end-users (as in step 25). The end-user may also specify one or more sub-sequences contained in the top-level sequence, each sub-sequence indicating that a corresponding subset of contents in the collection is to be provided before providing the contents corresponding to any other (for example, the next or the previous) sub-sequence.

In step 28, content server 15 facilitates an end-user to specify transitions effects between the included contents and sequences. The transition effects may be specified for each pair of contents according to the top-level sequence, or for any two pairs of sub-sequences (specified by the end-user in step 27). Examples of transition effects are blinds horizontal, blinds vertical, box in, box out, checkerboard across, checkerboard down, comb horizontal, comb vertical, etc. as is well known in the arts.

In step 29, content server 15 facilitates an end-user to create associations between locations in a selected content with other contents in the collection. For example, the end-user may indicate that a second content is to be provided (displayed) to the requesting end-user in response to the end-user selecting a specific location in a first content. Content server 15 may accordingly store such associations as part of the content collection.

Thus, content server 15 facilitates end-users (using one of client devices 11*a*-11*c*) to create and store desired content collections. It may be appreciated that the above noted steps may be appropriately performed for modification of an existing content collection as well. The stored content collections may then be provided in response to requests for the collections, as described below with examples.

5. Illustrative Example

FIGS. 3, 4A-4D, 5A-5B, 6A-6D, and 7A-7C together illustrate the manner in which content mediated engagements are enhanced according to several aspects of the present invention in one embodiment.

The features of the present invention are described below with respect to a sales engagement (and correspondingly sales persons are assumed to be the end-users accessing the content collections) for illustration. However, various features of the present invention can be implemented in the content of other content mediated engagements (such as student-teacher engagement and doctor-patient engagement noted above) as well, as will be apparent to one skilled in the relevant arts by reading the disclosure herein.

Figure 3:
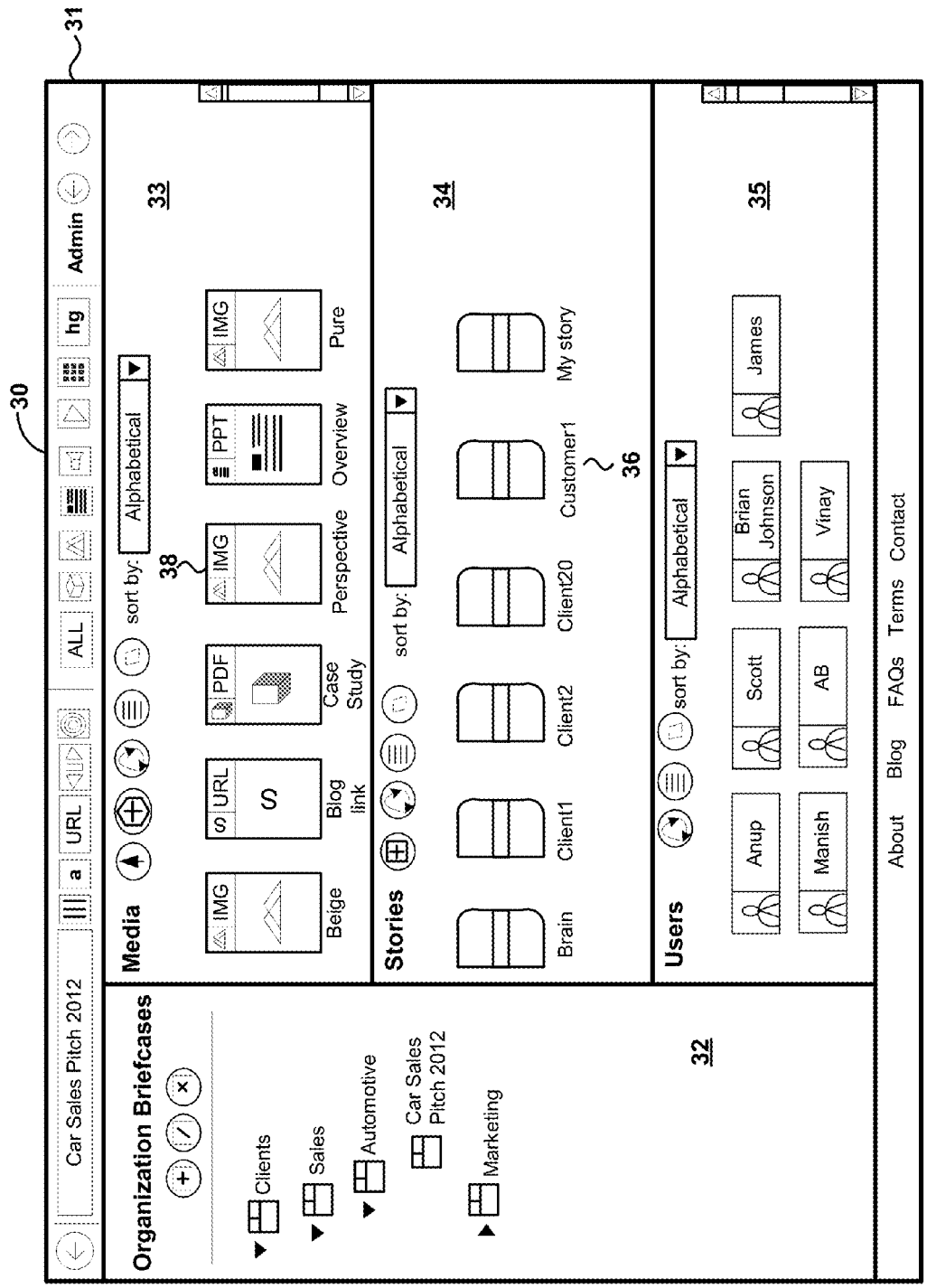
FIG. 3 illustrates the manner in which an end-user is facilitated to manage contents related to content mediated engagements in one embodiment.

Broadly, FIG. 3 illustrates the manner in which an end-user is facilitated to manage various contents, while FIGS. 4A-4D illustrate the manner in which a en-user is enabled to create a new content collection. FIG. 5 illustrates the manner in which a newly created content collection is maintained in repository 18. FIGS. 6A-6D illustrates the manner in which an end-user (such as a sales person) is provided contents of a previously specified content collection during an content mediated engagement. FIGS. 7A-7C illustrates the manner in which feedback on a content collection is processed. Each of the Figures is described in detail below.

FIG. 3 illustrates the manner in which an end-user is facilitated to manage contents related to content mediated engagements in one embodiment. Display area 30 depicts a portion of a user interface provided on a display unit (not shown in FIG. 1) associated with a client device (assumed to be 11a for illustrations). Display area 30 may be provided by content server 15 (for example, in the form or web pages) in response to an end-user sending appropriate requests using client device 11a. In an alternate embodiment, display area 30 may be provided by an application (such as a mobile app) executing in client device 11a, with the application designed to interface with content server 15 for providing various features of the present invention.

Broadly, an end-user manages various (desired) contents in the form of one or more "briefcases". The various briefcases themselves may be organized in the form of a hierarchy, such that a briefcase at a higher level in the hierarchy contains one or more briefcases at a lower level in the hierarchy. Only the relevant hierarchy of briefcases that is assessable (for which access rights have been provided) to the end-user may be displayed.

Thus, display area 32 depicts a hierarchy of briefcases that is accessible to the end-user (named "Admin" as shown in display area 31). The end-user may use the various buttons shown in display area 32 (and then the corresponding user interface provided) to add a new briefcase, to edit an existing briefcase, or to delete an existing briefcase. The end-user may select the side arrows shown in display area 32 to view the briefcases at the lower levels in the hierarchy. The end-user may also select one of the briefcases shown in display area 32 to view the details. Display area 31 indicates that the end-user (has selected and) is currently viewing the details of the briefcase named "Car Sales Pitch 2012" (hereafter referred to as the "car sales briefcase").

Display area 33 "Media" indicates the various contents (or portions thereof) that are available in repository 18. It may be observed that the contents are of different types such as images (indicated as IMG), links to external contents (URL), documents (PPT, PDF), etc. The end-user or a content developer may add/upload additional content to repository 18 by using the buttons (and corresponding user interfaces) shown in display area 33.

Each briefcase may include one or more stories, a story representing a content collection specified by an end-user. Thus, display area 34 "Stories" indicates the various content collections that are part of the car sales briefcase. Each story is associated with a unique identifier such as "Brain", "Client1", and "My Story" which enables the end-user (or other users) to access the desired story/content collection by specifying the associated identifier. Button 37 enables the end-user to add a new story (that is, create a new content collection), as described in below sections.

Display area 35 "Users" enable the end-user to control access to the various information shown in display area 30. In particular, the end-user is enabled to assign to different users, corresponding rights for accessing the contents, stories and/or briefcases shown in display area 30. The access rights may indicate whether a user is allowed to add, modify, delete, and/or access the specific ones of the contents, stories and briefcases.

Thus, an end-user is enabled to manage the various contents that are related to (and which can be used in) content mediated engagements. As noted above, the end-user is also facilitated to create new stories/content collections. An example user interface that may enable an end-user to create a new story/content collection is described below with examples.

6. Creating a Story

FIGS. 4A-4D together illustrates the manner in which an end-user is enabled to create a new content collection in one embodiment. Display area 40 is similar to display area 30, and depicts a portion of the user interface that may be displayed (associated with client device 11a) in response to the end-user selecting/clicking on (add story) button 37 in display area 34 of FIG. 3. Display area 41 is similar to display area 31, and indicates the name of the briefcase and the name of the end-user currently accessing the contents.

Display area 42 (of FIGS. 4A-4D) enables an end-user to create a new content collection/story as part of a briefcase (herein, the car sales briefcase as indicated by display area 41). Broadly, an end-user includes desired contents (or portions thereof) as various "pages" of the new story. The pages may then be organized as chapters, each chapter containing a sub-sequence of pages that are to be provided to a requesting user before the pages of another sub-sequence. Thus, each story may contain one or more chapters, with each chapter containing in turn one or more pages/contents as desired by the end-user.

Figure 4A:
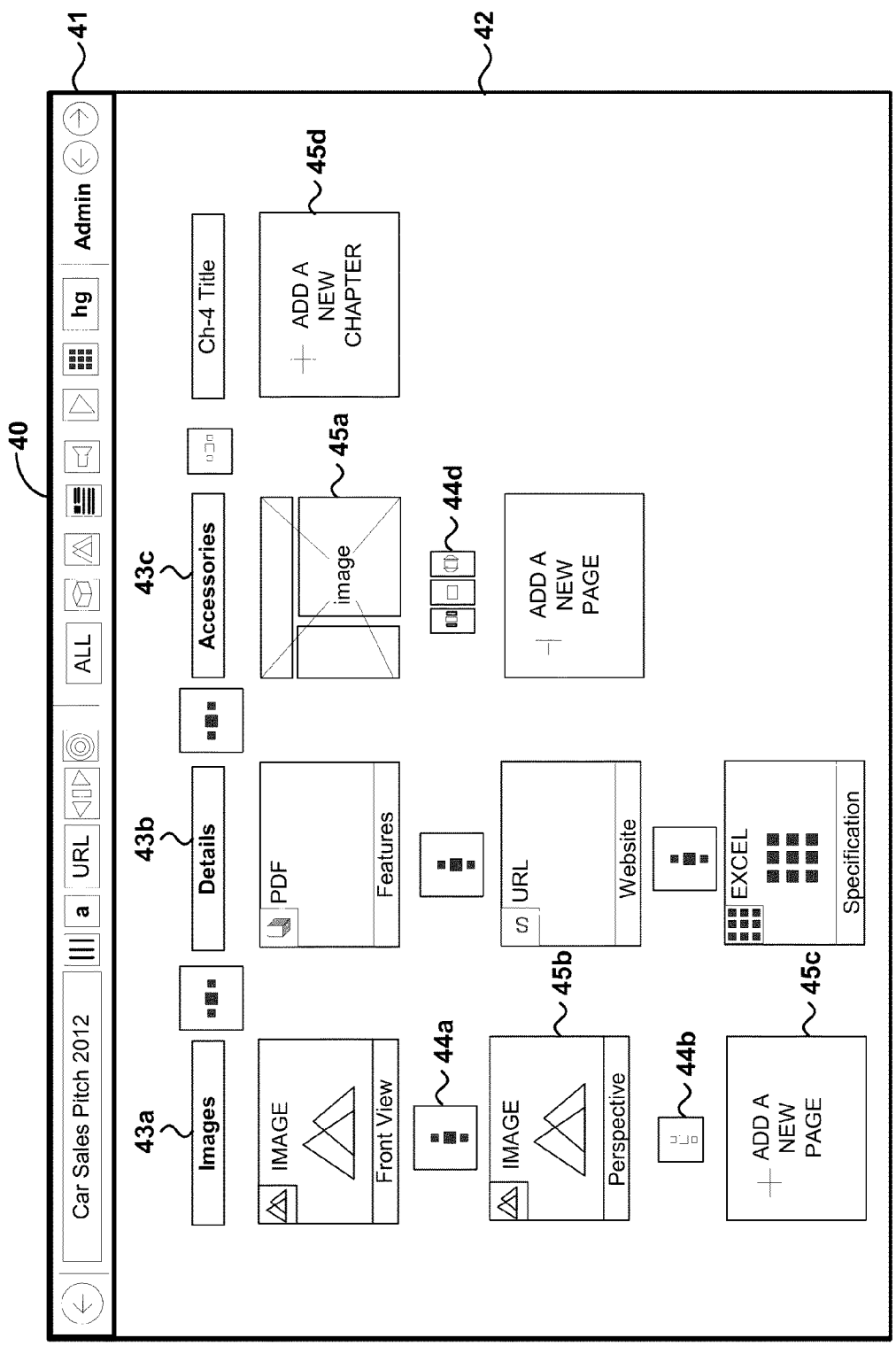
FIG. 4A illustrates the manner in which an end-user is enabled to create a story/content collection in one embodiment.

Referring to FIG. 4A, display area 42 depicts a story that is being created by an end-user. The end-user has created three chapters 43a-43c respectively named as "Images" (containing images of the car for which the sales pitch is being prepared), "Details" (containing details of the car), and "Accessories" (containing information on the accessories of the car). Each chapter is shown containing a sub-sequence of pages/contents. For example, chapter 43a is shown containing two image contents in the vertical direction (with one of them indicated to be page 45b), while chapter 43b is shown containing three pages (of different types) and chapter 43c is shown containing only a single page (45a).

It may be observed that the chapters/sub-sequences are shown along a first/horizontal direction/dimension, while the pages/contents of each chapter/sub-sequence are shown along a second/vertical direction/dimension. Accordingly, display area 42 may be viewed as organized as a two-dimensional matrix of chapters and pages. However, in alternative embodiments, the chapters and pages may be displayed along alternate dimensions, for example, chapters along the vertical dimension and pages along the horizontal dimension. Furthermore, only a few sample numbers of pages/chapters are shown in display area 42 for illustration. In actual scenarios, the numbers may be in the order of few hundreds, with the user being provided the ability to scroll in the horizontal and vertical direction to view/edit the pages.

It may also be appreciated that the contents may be organized in more than two dimensions, that is, as a multi-dimensional matrix. For example, the chapters themselves may be organized as sections, each section containing one or more chapters, and accordingly a matrix with the sections along a first (depth) dimension, chapters along a second (horizontal) dimension and pages along a third (vertical) dimensions may be displayed to the end-user. The features of the present invention may be implemented for any such multi-dimensional organization as well, as will be apparent to one skilled in the relevant arts by reading the disclosure herein.

An aspect of the present invention facilitates the end-user to specify navigation links among for navigating among the pages/contents of a chapter/sub-sequence and also links for navigating among the different chapters/sub-sequences. Another aspect of the present invention facilitates the end-user to specify the transition effects between pairs of pages/contents in a chapter/sub-sequence and/or between pairs of chapters/sub-sequences. Examples of transition effects (as noted above) are blinds horizontal, blinds vertical, box in, box out, checkerboard across, checkerboard down, comb horizontal, comb vertical, etc. as is well known in the arts.

In one embodiment shown in FIG. 4A, the navigation links and transition effects are provided together, with each navigation link being associated with a corresponding transition effect. Each of links 44a-44d depicts a corresponding status of a navigation link/effect between pairs of contents. In particular, link 44a represents a navigation link and corresponding effect specified between pages/contents of a chapter, while link 44c represents a navigations link and corresponding effect specified between two chapters. Link 44b indicates that there is no link/effect specified between the corresponding pages (since the user has specified only one page).

Link (icon) 44d illustrates the manner in which an end-user may specify the link/effect between two pages. The end-user upon clicking on an unspecified link (similar to 44c) may be displayed multiple options for the transition effects as shown in link 44d. A user may then select the desired option/transition effect, thereby specifying the effect between the two pages/chapters. It should be noted that the specification of the transition effect between two pages/chapters also indicates the specification of the navigation link between the corresponding two pages/chapters. Thus, a user by using the various links 44a-44d shown in FIG. 4A is enabled to specify the desired navigation links/transition effects between the contents in the new content collection being created.

It may be appreciated that the links/effects between the chapters/sub-sequence enforces an order in which each chapter is to be displayed, while the links/effects between sequence of pages in each chapter enforces and order in which each page within a sequence is to be displayed. As such, the combination of chapters and the sequences within each chapter may be viewed as enforcing a collection/first sequence on the list of all the contents/pages in the content collection/story. Content server 15 may ensure that the collection sequence is enforced when providing the contents to an end-user requesting the story/content collection.

Each of pages 45a-45d represents a page/content added/sought to be added to the story. In particular, page (icon) 45c enables an end-user to add a new page/content to a chapter (here 43a), while page (icon) 45d enable the end-user to add a new page and a new chapter to the story. Page 45b depicts an image content that is added to chapter 43a, while page 45a represents a new page that has been added by the end-user to chapter 43c. The manner in which an end-user adds a new page/content to the story is described below with examples.

7. Adding a New Page

Figure 4B:
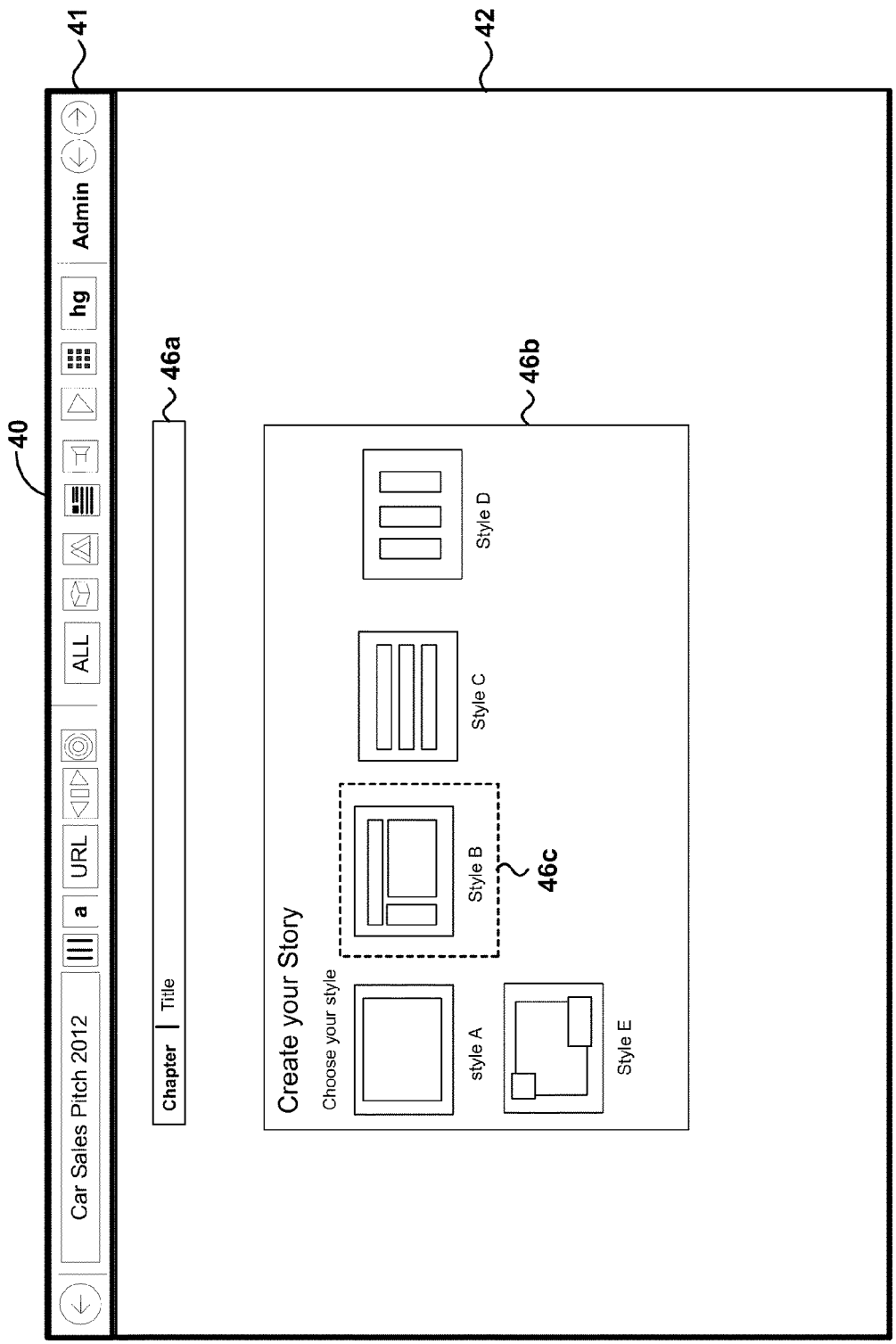
FIG. 4B illustrates the manner in which an end-user is enabled to select a style/layout for a new page/content sought to be added to a story/content collection in one embodiment.

Referring to FIG. 4B, display area 42 there depicts a portion of a user interface that enables a user to specify the identifier and style of a new page/content. It may be appreciated that a new chapter icon similar to 45d may be displayed in place of 45a in display area 42 of FIG. 4A, with the user then selecting such a new chapter/page icon. The user interface of FIG. 4B may then be displayed in response to the end-user selecting the new chapter/page icon at the location of page 45a.

Display area 46a enables the user to specify an identifier for the chapter and the page corresponding to the content sought to be added. Display area 46b enables the user to select the manner/style of presentation of the content in the new page. In particular, display area 46b is shown displaying different layouts named as Style A, Style B, etc., with each layout specifying the manner in which contents are to be displayed. The user is shown selecting (as indicated by the dotted rectangle) layout 46c named "Style B" from the layouts shown in display area 46b.

Figure 4C:
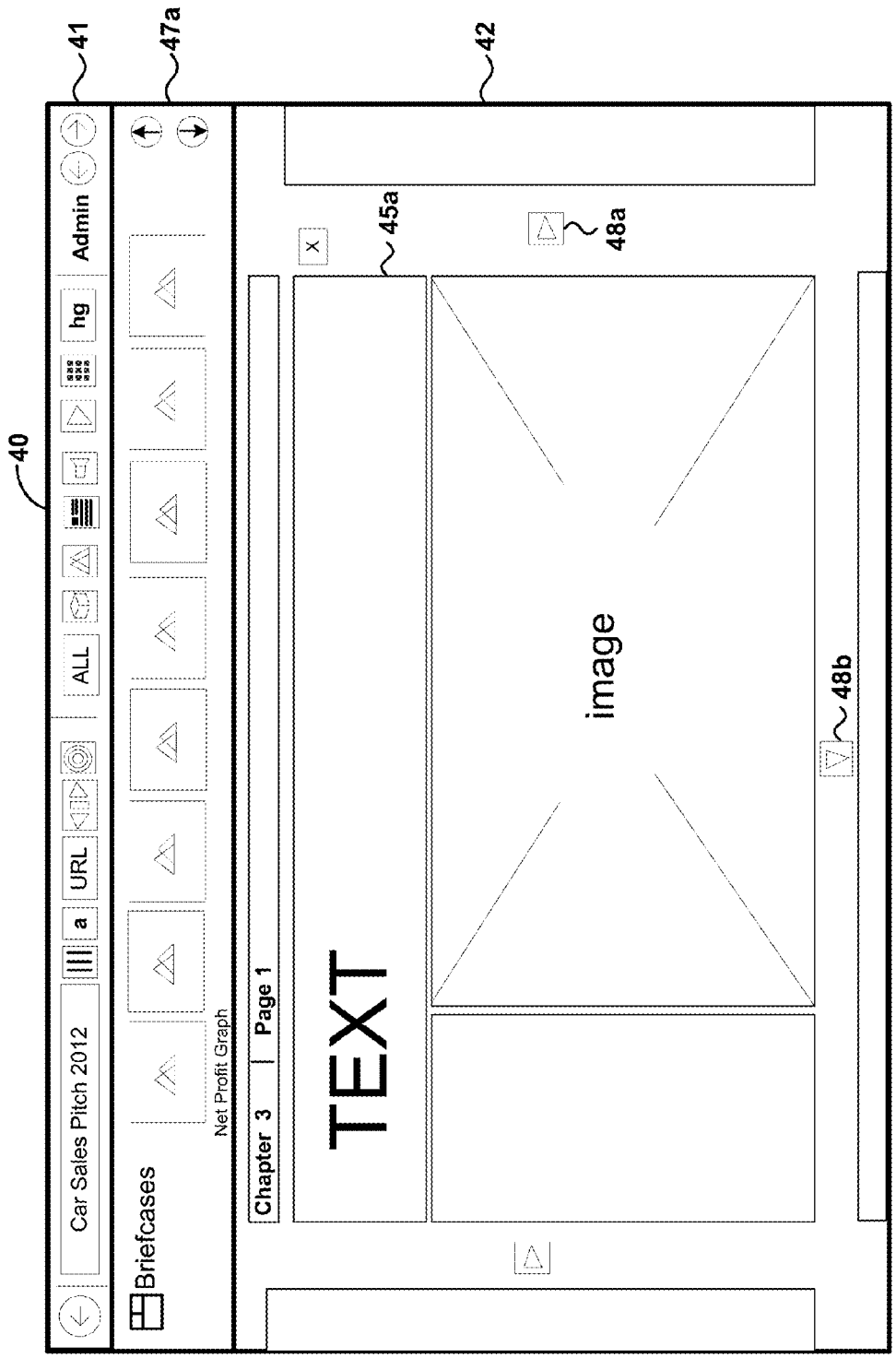
FIG. 4C illustrates the manner in which an end-user is enabled to add desired content to a new page/content sought to be added to a story/content collection in one embodiment.

Referring to FIG. 4C, display area 42 there depicts a user interface that enables a user to assemble desired contents according to a layout (in this example, Style B). Display area 42 of FIG. 4C may be displayed in response to the user selecting layout 46c in FIG. 4B. Thus, display area 42 indicates that the page 45a (entitled "Chapter 3|Page 1") is being created/assembled from other contents. Button 48a enables the user to scroll to the (first page in the) next chapter, while button 48b enables the user to scroll to the next page (in the same chapter). Buttons 48a-48b may not be displayed if such a first page of the next chapter or a next page in the same chapter is not present (for example, not yet specified by the end-user).

Display area 47a enables a user to select the desired portions of content to be included in the new page sought to be created. In FIG. 4C, display area 47a is shown displaying the contents and content collections from different brief-cases. This enables the end-user to select and incorporate portions of the content/content collections from other brief-cases into the new page. Though not shown, it may be appreciated that display area 47a may provide any relevant content portions/tools necessary for the end-user to add desired content to the new page. For example, in the scenario that the end-user wishes to add text to the page, tools such as for adding text, changing the font of the text, changing the size/color/style of the text, etc. may be provided in display area 47a.

It may be appreciated that the same content may be included as part of pages belonging to different content collections. Thus, a content developer can provide a standard content that can then be incorporated by different end-users at different portions of respective content collections. By facilitating a common base content to be reused, the standardization of the common content may be effected, thereby ensuring that all customers of the business entity are provided the same or very similar contents. Furthermore, such reuse facilitates the building of a repository of standard contents and reduces the time and resources required for creating new content collections.

It may be further appreciated that the manner of addition of content portions to the new page may be controlled by a content developer providing such content portions. For example, a content developer may provide a standard content and also an indication indicating that the standard content cannot be modified by the current end-user creating the page. In response to such an indication, content server 15 may allow the end-user to merely add the standard content as a whole to the new page (and/or the new content collection). Any editing/modification of the standard content may be prevented by not providing edit/modify buttons in display area 47*a*.

In a scenario that such an indication is not provided by a content developer, the end-user is enabled to modify the standard content (for example, to change some of the text/images present in the standard content) to form a modified content and include the modified content as part of the page/chapter/story. Different end-users may modify the standard content to corresponding desired modified contents and include such modified contents in respective content collections.

In one embodiment, the standard content is in the form of a document (such as a PDF or DOC file) containing multiple pages. Each end-user may then modify such a document by specifying a mask indicating the specified ones of the pages of the document that is to be included or excluded from the new content (45*a*). Content server 15 includes only the pages in the new content based on the specified mask.

A user by using the interfaces of FIGS. 4B and 4C may create and add the desired new pages/contents as part of the new story/content collection sought to be created. An aspect of the present invention facilitates an end-user to associate desired contents with (visual) locations in another content (displayed to a requesting user). Such locations in a first content associated with corresponding secondary contents are hereafter referred to as "hotspots", and the manner in which an end-user is facilitated to specify such hotspots is described below with examples.

8. Specifying Hotspots

Figure 4D:
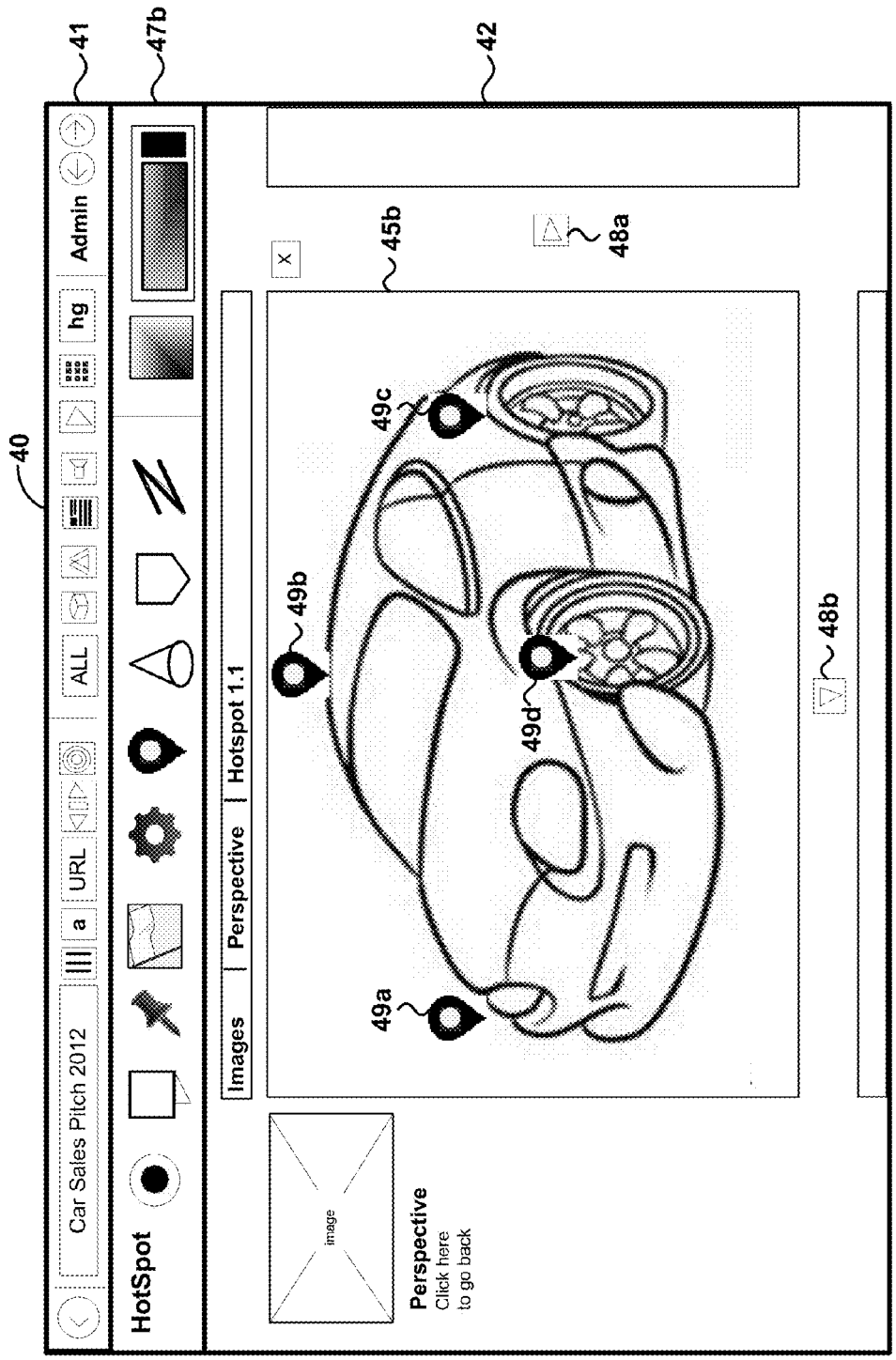
FIG. 4D illustrates the manner in which an end-user is enabled to specify hotspots for a desired content in one embodiment.

FIG. 4D illustrates the manner in which an end-user is enabled to specify hotspots for a desired content in one embodiment. In particular, display area 42 of FIG. 4D depicts a portion of a user interface that enables a user to specify hotspots for any content, such as the image of page 45*b*. The user interface of FIG. 4D may be displayed in response to the end-user selecting the page (icon) 45*b* in FIG. 4A. The end-user may use the tools shown in display area 47*b* to specify different types of hotspots for the image content of page 45*b*.

Each of hotspots 49*a*-49*d* represents a location associated with a corresponding image as specified by the end-user using the tools shown in display area 47*b*. It may be observed that each of hotspots 49*a*-49*d* has a corresponding location on the image. Each hotspot 49*a*-49*d* is also associated with a corresponding content such as another image, text, link to an external content using appropriate user interface (not shown in FIG. 4D).

It may be appreciated that the hotspots are shown in FIG. 4D as being specified with respect to an image content of page 45*b*. However, in alternative embodiments, such hotspots may be associated with the locations in any type of content, such as text, audio or video content (for example, with different time instances during playback of a video), as will be apparent to one skilled in the relevant arts by reading the disclosure herein.

After adding the desired chapters, pages and hotspots as part of new content shown in FIG. 4A, the end-user may select a Save option/button (not shown in FIG. 4A) to add the new content collection to the display interface of FIG. 3. In one embodiment, the Save option/button is provided in display area 41 of FIG. 4A. Alternatively, the user may be provide the Save option when the user clicks on the back arrow (shown before the briefcase name) in display area 41 of FIG. 4A, indicating that the user wishes to go back to the display interface of FIG. 3. For illustration, the description is continued assuming that the new content collection/story has been saved as "Customer1" in the briefcase named "Car Sales Pitch 2012" under the hierarchy "Clients-Sales-Automotive". The newly saved story is shown as story 36 in display area 34 of FIG. 3.

Thus, a user is enabled to create any desired story/content collection using the user interfaces shown in FIGS. 4A-4D. After a user creates a new story/content collection, content server 15 may receive (for example, in response to the user selecting the Save option/button) and store (in repository 18) data indicating the newly created content collection. The manner in which content server 15 may store data indicating a content collection is described below with examples.

9. Storing Content Collections in Repository

FIGS. 5A and 5B together illustrates the manner in which data representing a content collection is maintained in repository (18) in one embodiment. In particular, FIG. 5A depicts portions of the data corresponding to a user-specified content collection, while FIG. 5B depicts portions of the data corresponding to hotspots specified for the same content collection. Each of the Figures is described in detail below.

For illustration, the data representing the content collection is shown as being maintained (in repository 18) according to JSON (JavaScript Object Notation) format, well known in the arts. However, in alternative embodiments, the content collection may be represent using other formats (such as XML) and/or other data structures (such as tables in a database), as will be apparent to one skilled in the relevant arts by reading the disclosure herein.

Referring to FIG. 5A, each of data portions 51 and 52 specifies the details of corresponding chapters in the content collection. The chapters are respectively named "Images" and "Details" as indicated by data portions 51*a* and 52*a*. Data portions 51 and 52 may be stored (by content server 15) in repository 18, in response to the user specifying and content server 15 receiving chapters 43*a* and 43*b* of FIG. 4A. The details of other chapters (not shown) may be similarly stored in repository 18.

Each of data portions 53*a*-53*b* and 54*a*-54*b* specifies the details of corresponding pages in the content collection. In particular, each data portion (such as 53*a*) specifies the media/content type ("jpg"), the media/file name ("1.1 Front View.jpg"), and a media identifier ("7792") uniquely identifying the media/content. Similarly, other data portions specify the detail of corresponding pages. It may be observed that data portions 53a and 53b are shown as being part of data portion 51, indicating that the corresponding pages are part of the chapter "Images". Similarly, the pages corresponding data portions 54a and 54b are shown as being part of the chapter "Details" (due the data portions shown within data portion 52).

Data portion 55 indicates that an end-user has specified one or more hotspots associated with one of the pages/contents in the corresponding chapter (here 43a named "Images"). A client device (providing the content collection to an end-user) is designed to request content server 15 in response to data portion 55 being present in the data. For example, the client device may send a request URL such as "http://test.acme.com/hotspotData?mediaID=7821" (where 7821 represents the unique identifier associated with the hotspot as shown in data portion 55) to content server 15 for retrieving the data corresponding to the hotspots. Content server 15, upon receiving such a request, then retrieves the details of the hotspots associated with the pages/contents and sends the retrieved details as a response to the request. The manner in which details of the hotspots may be maintained in repository 18 is described in detail below.

Referring to FIG. 5B, data portion 56 indicates that the hotspots details are for the media/hotspot identifier "7821", that is for the pages of chapter "Images" (as indicated by data portions 55 being within data portion 51). Data portion 57 specifies the location (x and y coordinates) and the size ("1") of the pop-up window for a first hotspot (indicated by the index "1"). The locations and sizes of the pop-up window for the other hotspots may similarly be specified by using an appropriate index such as 2, 3, etc.

Data portion 58 indicates the media identifier of the background media (on which the hotspots are to be displayed), and also the content associated with each hotspot (in the attribute "mediaList"). The background media id "7794" corresponds to the media/page shown in data portion 53b, indicating that the hotspots are to be displayed in association with the page "1.2 Perspective Small.jpg". The media list (in data portion 58) indicates for each hotspot index, the corresponding media identifier (on the left hand side) and the corresponding name and type of the media/page (on the left hand side) associated with the corresponding location.

For example, the data portion "7796": ["1.3 Interiors.jpg", "jpg"] associated with hotspot index "1" in data portion 58 indicates that a (second) media/content having the identifier "7796", named "1.3 Interiors.jpg" of the type "jpg" is associated with the location having the x co-ordinate "876" and y-coordinate "570" (as indicated by data portion 57 for hotspot index "1") in a (first) media/content named "1.2 Perspective Small.jpg". Similarly, the locations of other hotspots and corresponding associated contents may be specified and stored in repository 18.

Thus, content server 15, in response to an end user specifying the details of a content collection using the user interfaces of FIG. 4A-4D, receives (from client device 11a) data similar to that shown in FIGS. 5A and 5B indicating the details of the content collection and then stores the received data in repository 18.

It may be appreciated that such content collections may then be accessed by end-users during content mediated engagements. For example, a sales person (another end-user) engaging a prospective customer for purchase of the car, may wish to access the content collection shown in FIGS. 4A-4D and to provide such a content collection to the customer using one of client devices 11a-11c. The manner in which such an end-user may access the desired content collection is described below with examples.

10. Accessing Content Collections

Figure 6A:
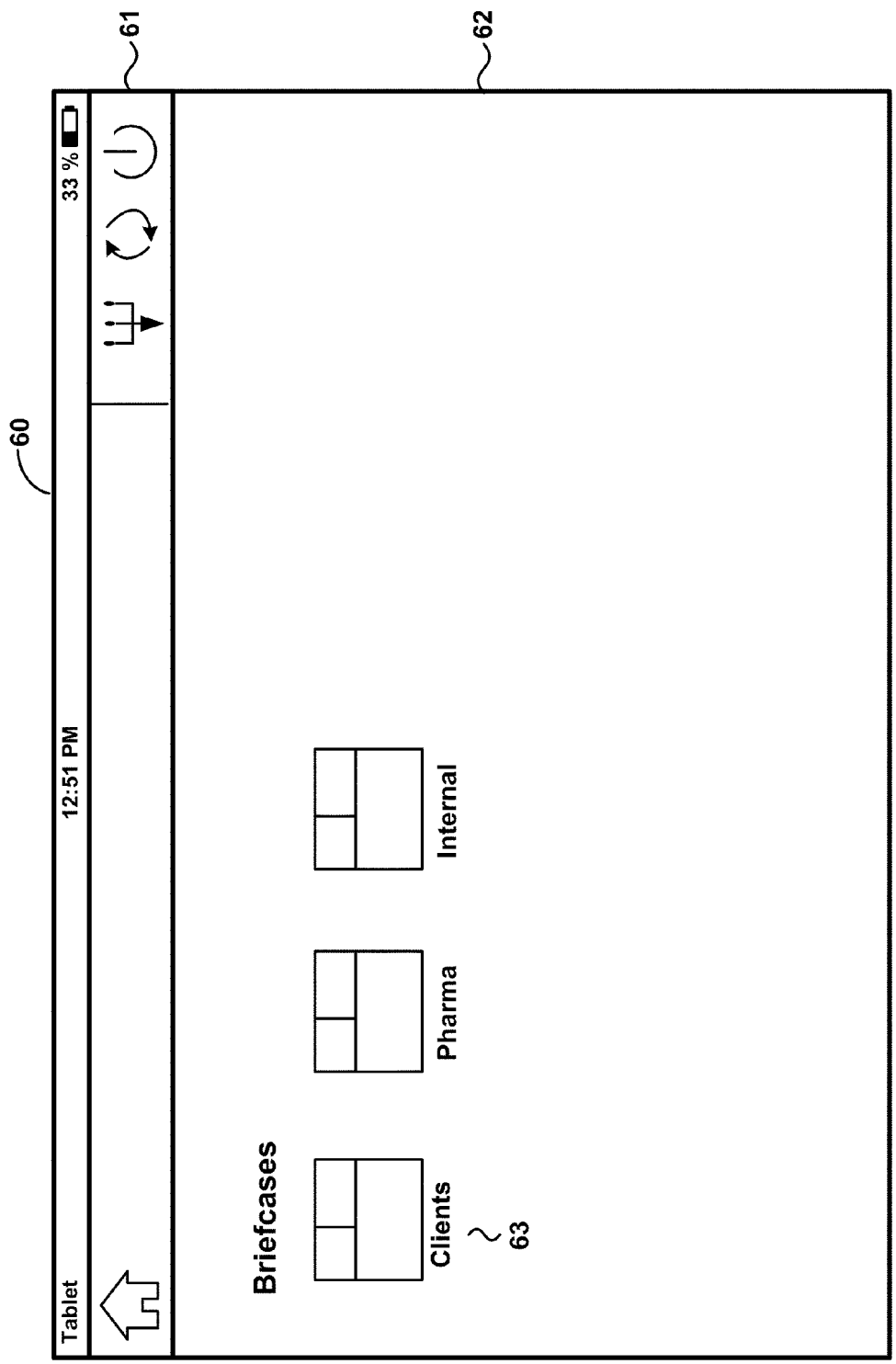
FIG. 6A illustrates the manner in which an end-user/sales person is enabled to select a briefcase containing the content collection/story desired to be accessed in one embodiment.
Figure 6B:
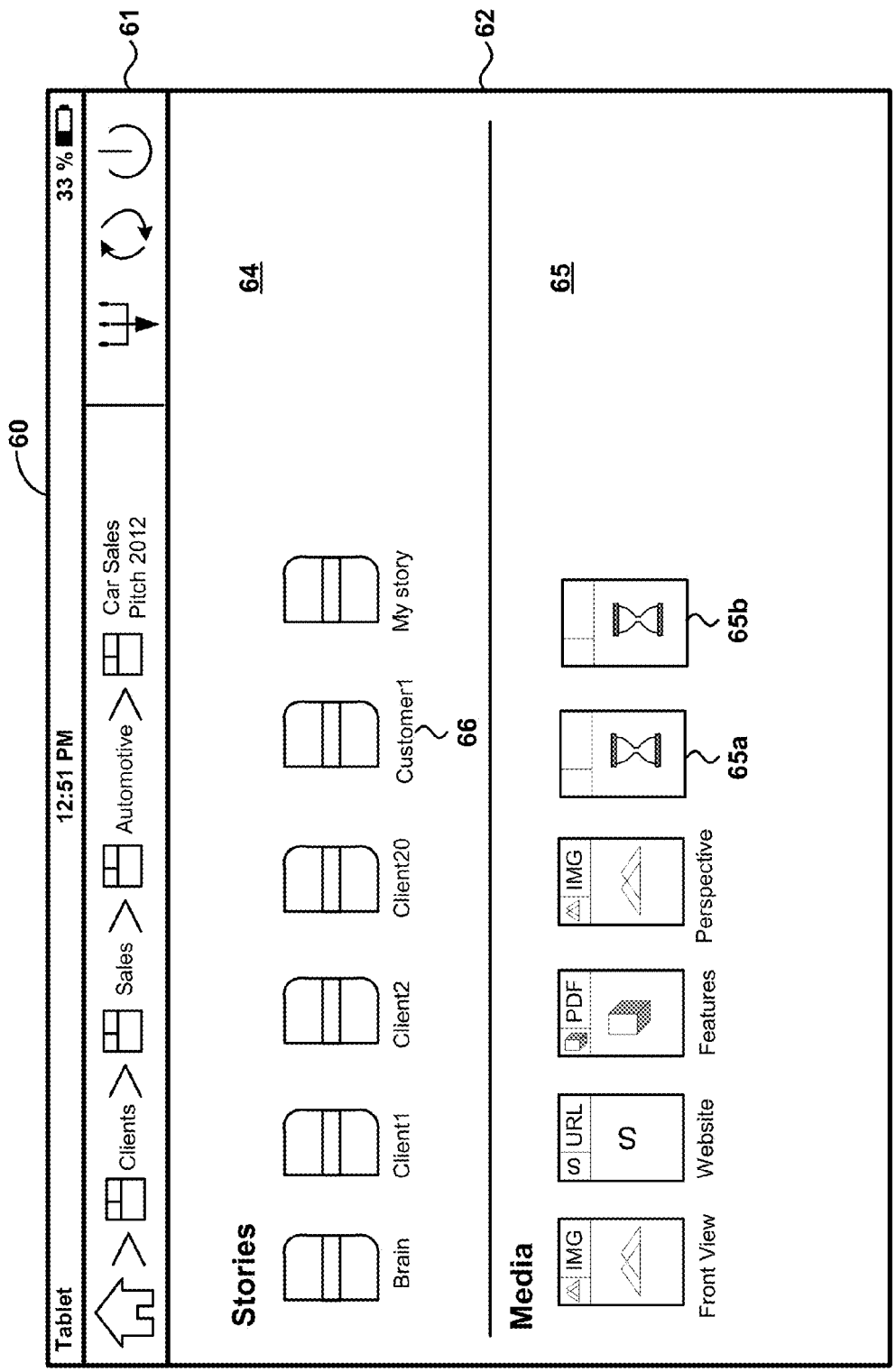
FIG. 6B illustrates the manner in which an end-user/sales person is enabled to select the desired content collection to be accessed in one embodiment.
Figure 6C:
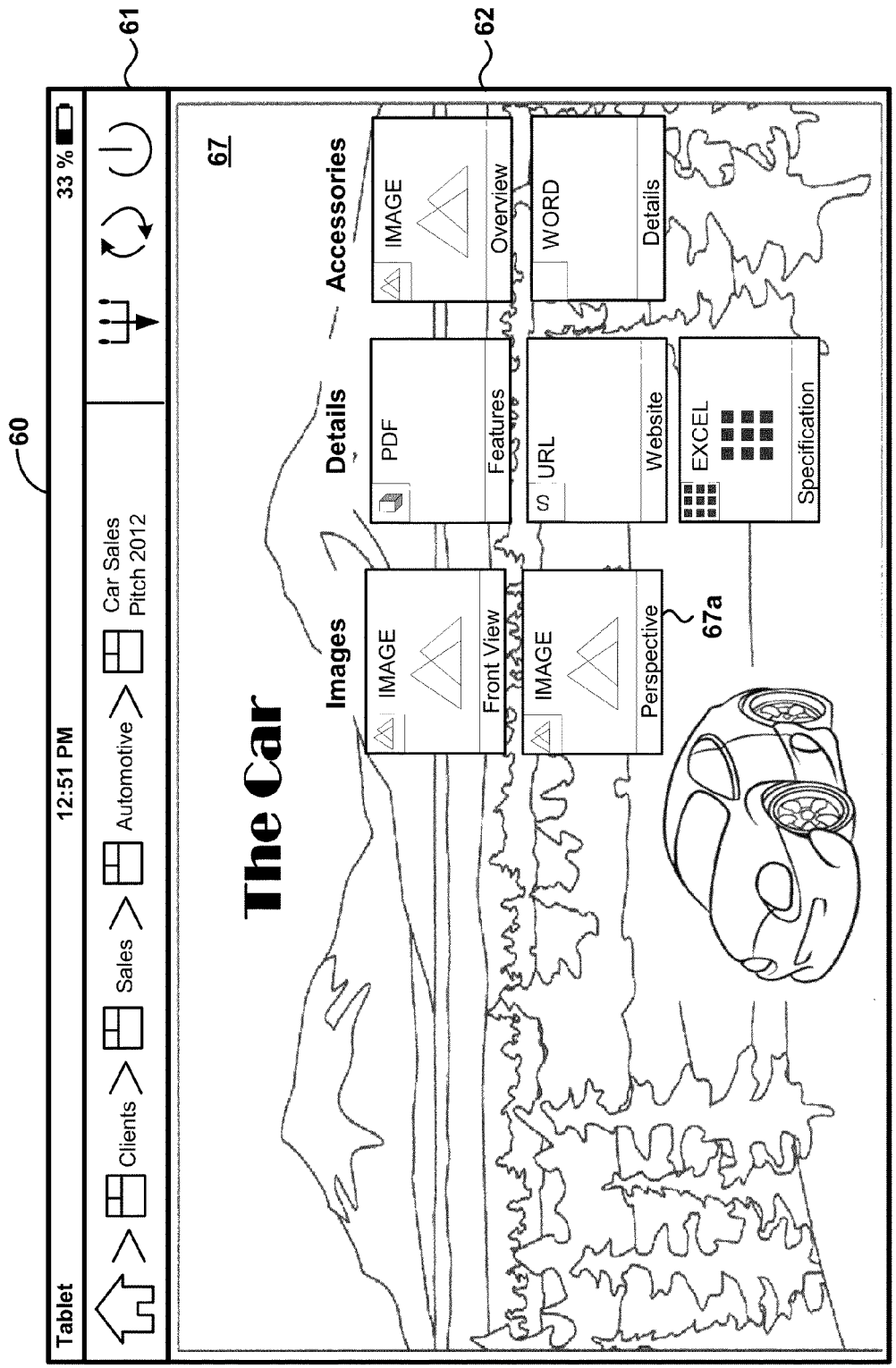
FIG. 6C illustrates the manner in which a selected content collection is provided to an end-user/sales person in one embodiment.
Figure 6D:
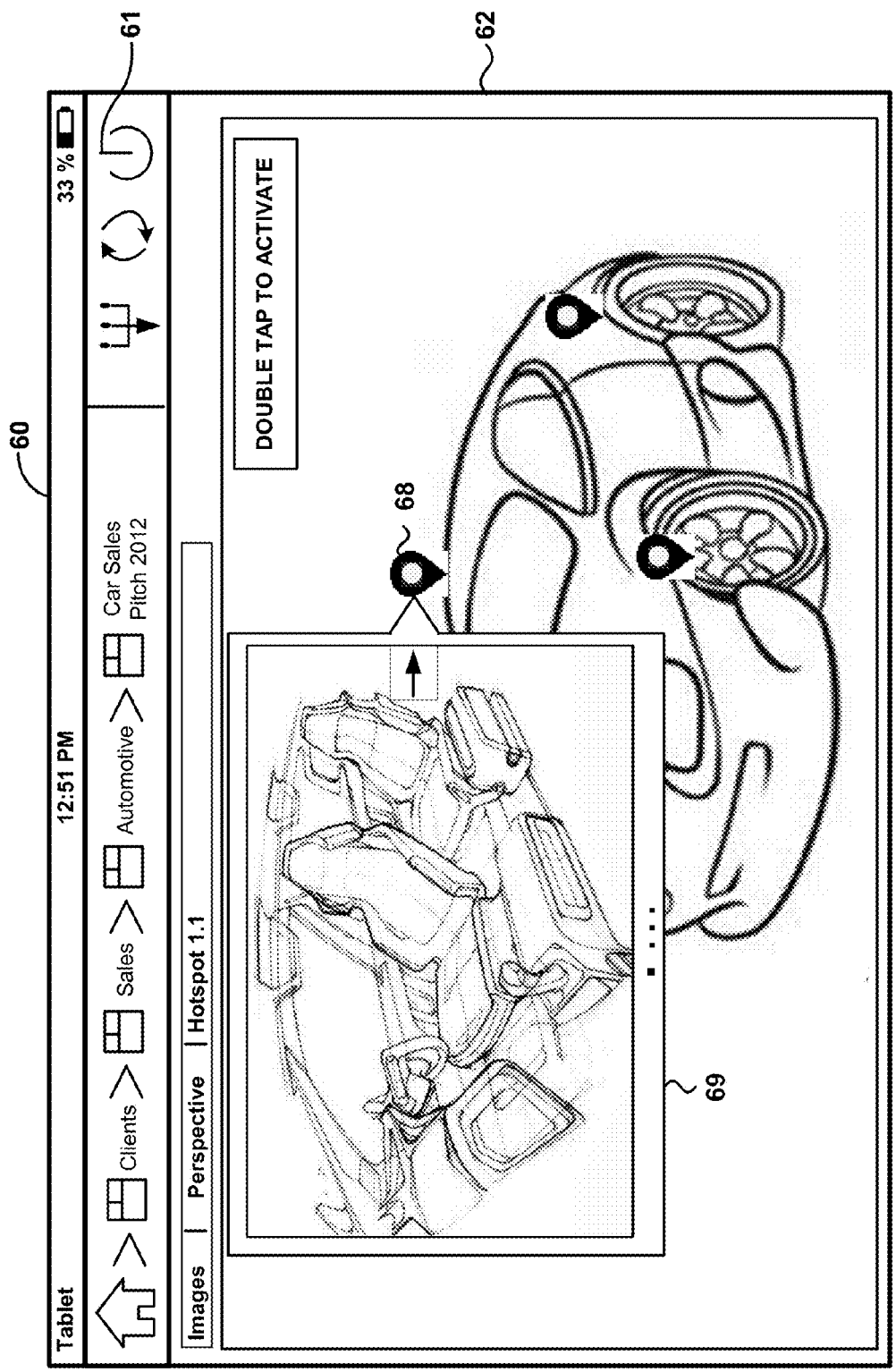
FIG. 6D illustrates the manner in which additional content is provided to an end-user/sales person upon selection of hotspots in one embodiment.
Figure 7A:
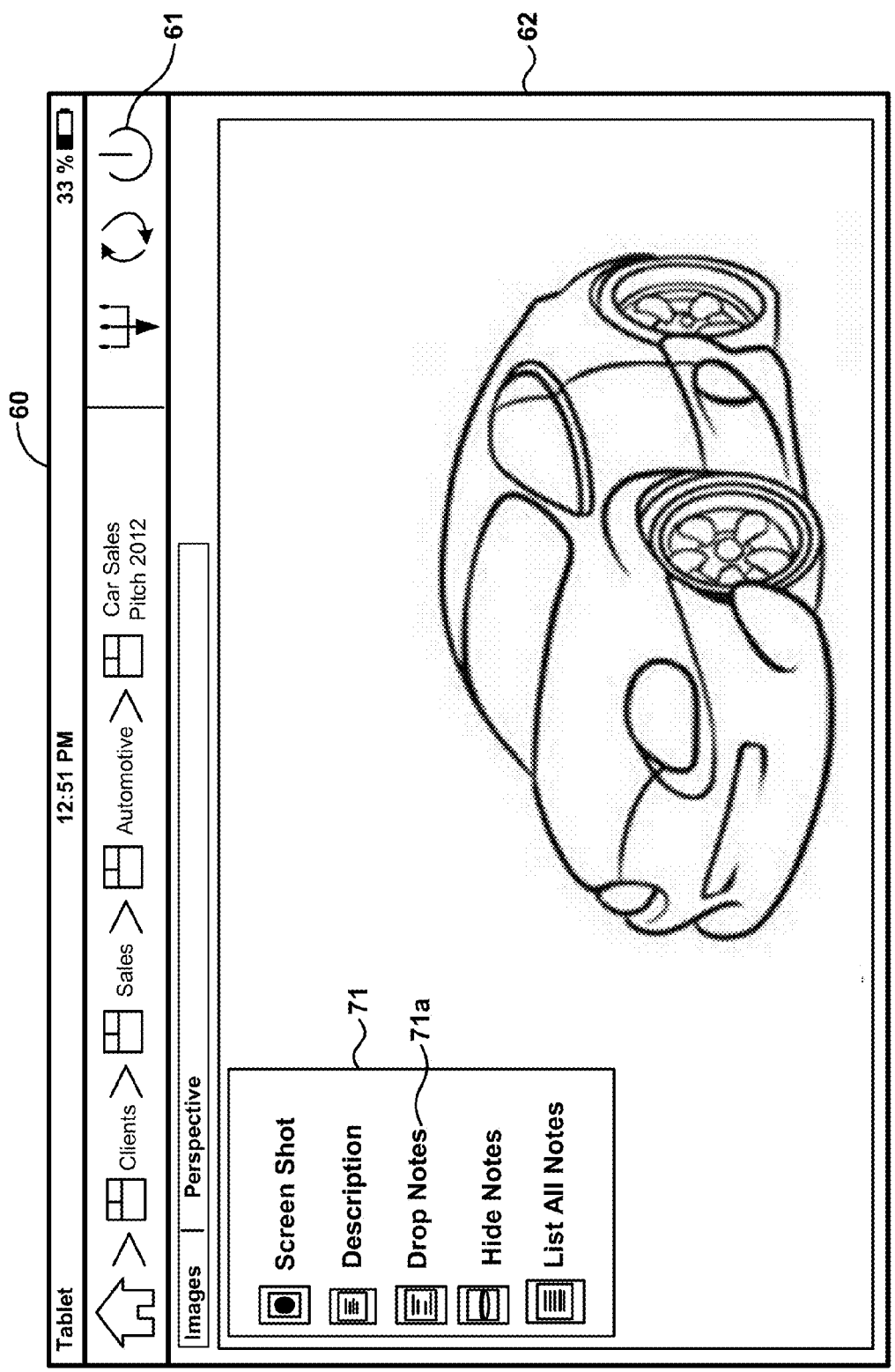
FIGS. 7A and 7B together illustrates the manner in which an end-user/sales person viewing a content collection is facilitated to provide feedback in one embodiment.
Figure 7B:
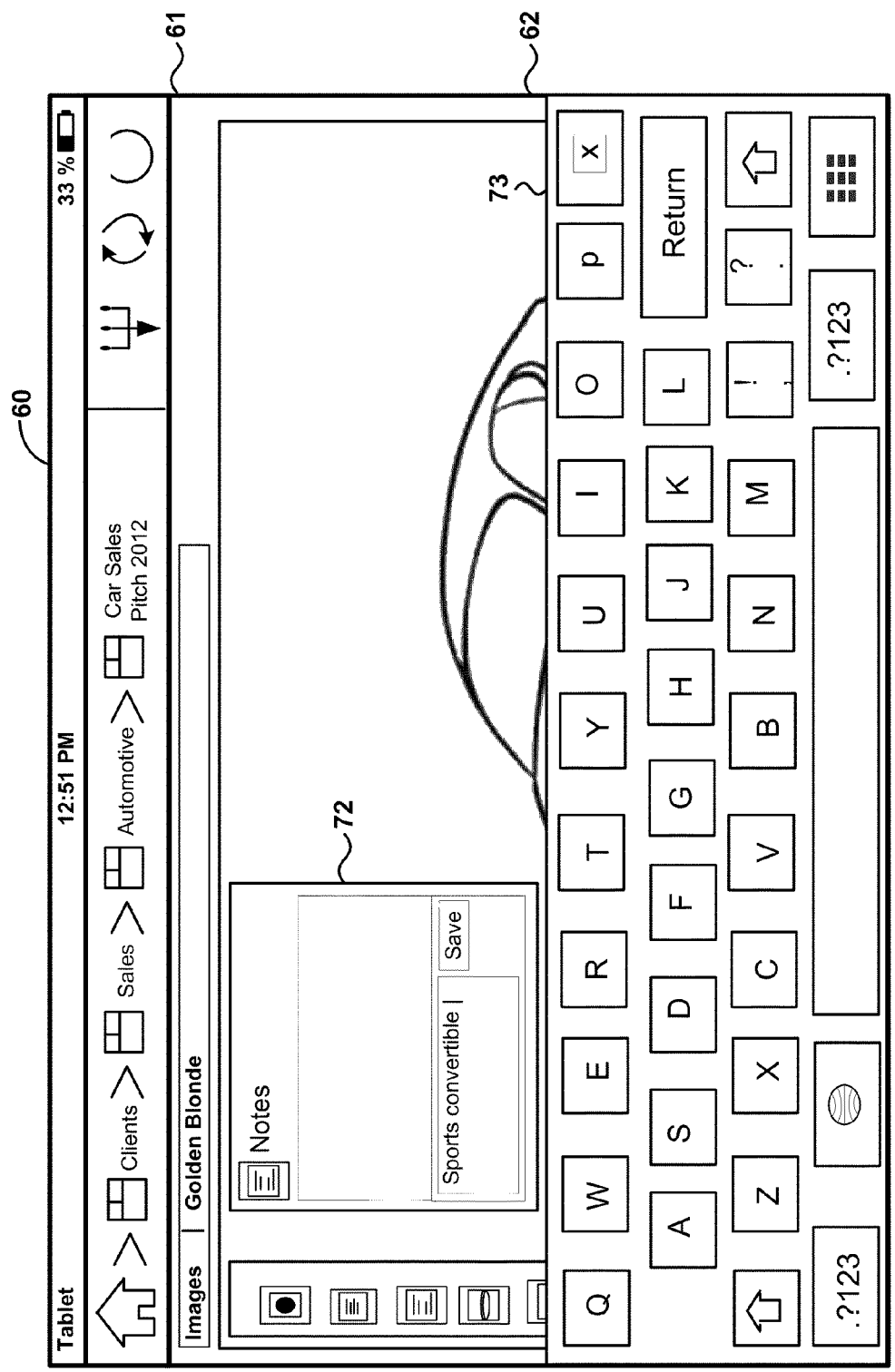

FIGS. 6A-6D together illustrates the manner in which an end-user (such as a sales person) is provided contents of a (previously specified) content collection during a content mediated engagement in one embodiment. In particular, FIGS. 6A and 6B illustrates the manner in which the end-user is enabled to access/select a desired story/content collection, while FIGS. 6C and 6D illustrates the manner in which a selected content collection is provided to the end-user. Each of the Figures is described in detail below.

Referring to FIG. 6A, display area 60 depicts a portion of a user interface provided on a display unit (not shown in FIG. 1) associated with a client device (assumed to be 11c for illustrations) used by the end-user/sales person. Display area 60, similar to display area 30, may be provided by content server 15 (for example, in the form or web pages) in response to an end-user sending appropriate requests using client device 11c. In an alternate embodiment, display area 60 may be provided by an application (such as a mobile app) executing in client device 11c, with the application designed to interface with content server 15 for providing various features of the present invention.

Display area 61 of FIG. 6A indicates the specific briefcase currently accessed by the end-user. The "Home" icon indicates that the end-user is currently at the root of the hierarchy of the briefcases. Display area 61 also provides various buttons (shown on the right side) that enables the end-user to refresh the display, to share the content on social networking sites, and to close the application/browser.

Display area 62 of FIG. 6A shows the briefcases that are available (for which the user has rights) to the end-user. Such availability may be determined based on the identification of the end-user (for example, by requiring the end-user to provide a user name and password), and/or the identification of the client device (for example, an identifier of the hardware of the device). Display area 62 is shown displaying the briefcases named "Clients", "Pharma" and "Internal" at the root of the hierarchy (consistent with the "Home" icon indication in display area 61).

An end-user/sales person may select a desired briefcase (such as 63) to be opened, with display area 62 then being populated with the briefcases at the next lower level in the hierarchy to the selected briefcase. The end-user may similarly select the desired briefcases at the different levels and navigate to the specific/lowest level briefcase (that does not in turn contain other briefcases) sought to be opened. The description is continued assuming that the end-user has navigated to the lowest level briefcase named "Car Sales Pitch 2012" under the hierarchy "Clients-Sales-Automotive".

Referring to FIG. 6B, display area 61 there is shown to indicate that the current briefcase being accessed by the end-user is "Clients-Sales-Automotive-Car Sales Pitch 2012" (based on the end-user selecting the corresponding briefcases in display area 62 of FIG. 6A). Display area 62 of FIG. 6B is shown displaying the contents of the selected briefcase "Car Sales Pitch 2012", since the selected briefcase is at the lowest level in the hierarchy.

Display area 64 shows the various stories/content collections included in the selected briefcase, including story 66 (named "Customer1") that was created using the interfaces of FIG. 4A-4C. Display area 65 shows the media/contents that form part of the various stories in the selected briefcase. The media/pages/contents are shown being downloaded, either by sending appropriate requests to content server 15 or directly from repository 18. The hourglass icons in media/content 65a and 65b indicate that these contents are being currently downloaded. The contents whose downloading is completed are shown identified by their names such as "Features" and "Perspective". Such downloading of the content may facilitates the content collections to be viewed off-line (without requiring connection to network 12) on client device 11c.

An end-user/sales person may then select one of the stories/collections such as story 66 shown in display area 64. In response to the selection, client device 11c may provide/display the details of the selected story while continuing to download pages/contents in the background. Alternatively, client device 11c may prioritize the contents of the selected story for downloading, wait for all the contents to be downloaded and then display the contents of the selected story. The manner in which client device 11c may provide the contents of a selected content collection is described below with examples.

11. Providing a Selected Content Collection

In the following description, the contents (of a content collection) are assumed to be visual for convenience and accordingly providing of the contents on a client device is equated to displaying of the contents visually on a display unit (associated with the client device). However, it may be appreciated that a content collection may include other types of contents such as audio, video, text, etc. and such contents may be appropriately provided, as will be apparent to one skilled in the relevant arts. For example, audio content (or the audio portion of a view content) may be played back on speakers associated with the client device, audio content may be displayed in the form of text, textual content may be read out in the form of an audio, video contents may be displayed in the form of images, etc. and such provisioning are also contemplated to be covered by several aspects of the present invention.

Referring to FIG. 6C, display area 67 is shown displaying the chapters/pages included in the end-user selected story 66 (named "Customer1") in the end-user selected briefcase named "Car Sales Pitch 2012". It may be observed that the chapters and pages shown in display area 67 are similar to the chapters and pages specified by another end-user using the user interfaces of FIG. 4A-4D. The details of the selected content collection may be provided in any convenient manner.

For example, content server 15, in response to end-user/sales person selecting a content collection, may send a link (in the form of a URL) to the selected content collection, with the contents of the selected content collection being displayed in response to the end-user/sales person selecting the link. Alternatively, content server 15 may send (to client device 11c) the selected content collection according to a pre-defined format and a player capable of playing the pre-defined format. The contents of the selected content collection is displayed when the end-user/sales person views the provided data according to the pre-defined format using the provide player. In another approach, content server 15 may send the contents a single document that can be viewed using client device 11c by the end-user/sales person. In other words, the single document is according to a common format (such as a PDF document, video file, presentation file, etc.) that is readily understood (without requiring additional software such as the player) by client device 11c.

In one embodiment, an application executing in client device 11c sends a request to content server 15 for the details of the content collection "Customer1" in response to the end-user/sales person selecting story 66 in display area 64 of FIG. 6B. In response to receiving such a request, content server 15 inspects repository 18 to identify the data corresponding to the requested story "Customer1". Content server 15, accordingly, identifies and retrieves the data shown in FIG. 5A, and then forwards the retrieved data to the application.

The application, in response to receiving the data of FIG. 5A, generates the interface of display area 67 based on the received data. For example, the application may identify the data portions (51 and 52) corresponding to the chapters, and then display the names of the chapters (data portions 51a and 52a) in the horizontal direction. The application may also identify data portions 53a-53b and 54a-54b and accordingly display pages (with the appropriate icons) corresponding to the identified data portions under the respective chapter. Thus, display area 67 is generated based on the data maintained in repository 18 for the selected story/content collection "Customer1".

An aspect of the present invention displays the pages of the selected story according to the collection sequence (and also the sub-sequences) specified by the creator of the story/content collection. As such, client device 11c displays each of the pages/contents according to the collection sequence, while ensuring that the pages/contents of a sub-sequence (for example, "Images") are all displayed before the pages/content of another sub-sequence (such as "Details"). Thus, the end-user/sales person and thereby the prospective customer is provided a coherent/consistent story on the car sought to be purchased.

An end-user/sales person may also select any of the pages displayed in display area 67 and view the contents of the selected page. The description is continued assuming that the end-user is currently viewing page 67a (corresponding to page 45b of FIG. 4A), either as part of the display of the sequence or by selecting the page.

Referring to FIG. 6D, display area 62 there is shown displaying the content/page corresponding to page 67a named "Perspective". Before displaying the page, the application inspects the data of FIG. 5A received from content server 15, to determine whether the page/content to be displayed includes any hotspots. Accordingly, the application identifies data portion 55 in FIG. 5A and then requests content server 15 for the hotspots data, by send a request URL such as "http://testacme.com/hotspotData?mediaID=7821" (as noted in detail above).

In response to receiving the data of FIG. 5B, the application identifies (based on data portions 57 and 58) that the media/content 7796", named "1.3 Interiors.jpg" of the type "jpg" is associated with the location having the x co-ordinate "876" and y-coordinate "570" (as indicated by data portion 57 for hotspot index "1") in the media/content named "1.2 Perspective Small.jpg". Similarly, the locations of other hotspots (such as 49a-49d shown in FIG. 4D) and corresponding associated contents may be identified by the application. The application may then download the associated contents from repository 18 (or via content server 15).

The application then displays indications (markers) for the identified hotspots at the specified locations on the displayed content "1.2 Perspective Small.jpg". Upon an end-user/sales person selecting one of the hotspots (here 68), the application displays (after downloading) the corresponding associated content as a pop-up window 69. It should be noted that the "selection" of the hotspot may be identified based on different types of inputs in any convenient manner. For example, hotspot 68 may be identified to be selected if the user uses a mouse-like device and clicks on the marker shown at the hotspot, if the user uses the mouse-like device and hovers the cursor over the marker for a pre-defined time (e.g. 5 seconds), if the user presses a specific combination of keys on a keyboard device, if the user swipes his/her finger across the marker (in a touch enabled client device), etc. or a combination of two or more inputs noted above.

Thus, an end-user/sales person is enabled to use a client device to access the desired content collections, with content server 15 (in combination with an application executing on the client device) then providing the access content collection on the client device. It may be appreciated that the end-users/customers accessing a content collection may wish to provide feedback on the (contents/pages) of the content collection. The manner in which an end-user may be facilitated to provide feedback on contents is described below with examples.

12. Feedback on Content Collections

FIGS. 7A-7C illustrates the manner in which feedback on a content collection is processed in one embodiment. In particular, FIGS. 7A and 7B illustrate the manner in which an end-user (such as a sales person) viewing the content collection is facilitated to provide feedback, while FIG. 7C illustrates the manner in which content developers/collection creators are enabled to view such feedback. Each of the Figures is described in detail below.

According to an aspect of the present invention, content server 15 is designed to receive from multiple end-users/sales persons, corresponding feedbacks on a content collection (or portions thereof) and then store the received feedbacks in repository 18. The feedback may be received in the form of text or as audio. Content server 15 may then provide such stored feedback in response to an end-user (such as a content developer using developer system 17 or another user who created the content collection using one of client device 11a-11c) requesting such feedback. Accordingly, the end user is enabled to assess the quality of the content collection (or portions thereof) in enhancing content mediated engagements.

Referring to FIG. 7A, display area 62 there is shown displaying the content/page corresponding to page 67a named "Perspective", similar to display area 62 of FIG. 6D. However, the hotspots (markers) that are shown displayed in FIG. 6D are not shown in FIG. 7A for convenience.

Display area 71 depicts a menu of options provided to the end-user for providing feedback on the content in the displayed page (67a). The menu may be provided in response to a user selecting/touching a specific portion (such as the upper left hand corner) of the display. Alternatively, a button may be provided in display area 61 of FIG. 7A, which upon selection by the end-user causes display area 71 to be displayed. The menu is shown providing various option to the end-user including a "screen shot" option to capture the screen details as an image, a "description" option to view any description associated with the content, a "drop notes" option 71a to add a new note/feedback to the displayed content, a "hide notes" option to hide any notes previously added, and a "list all notes" option to view all the noted previously added. The description is continued assuming that the end-user selects option 71a.

Referring to FIG. 7B, display area 72 represents a pop-up window that may be displayed in response to the end-user selecting option 71a in FIG. 7A. Display area 72 is shown providing a text area in which a user may provide any desirable feedback (such as the text "Sports convertible" shown there) and a "Save" button for sending the provided feedback to content server 15, which in turn stores the provided feedback in repository 18. As noted above, the feedback may be in the form of text or audio (based on the end-user providing the feedback using a microphone). The feedback in the form of the text may be specified by the end-user using a physical keyboard device (not shown) associated with client device 11c and/or using a virtual keyboard such as 73 shown in FIG. 7B. Virtual keyboard 73 may be provided by an operating system installed in the client device, as is well known in the relevant arts.

As noted above, content server 15 receives such feedback from different end-users and then stores the feedback in repository 18 (for example, in the JSON format noted above). The feedback may be stored associated with the story and/or page where the feedback was provided by the different users. In the above example, the feedback "Sports convertible" may be stored associated with the story "Customer1" and/or page "Perspective" in the chapter "Images". The stored feedback may then be provided to content developers or creators of the content collections, as described in detail below.

Referring to FIG. 7C, display area 70 represents a portion of a user interface similar to display area 30 of FIG. 3. Display area 70 may be displayed in response to an end-user (such as a content developer using developer system 17 or another user who created the content collection using one of client device 11a-11c) selecting the corresponding media (icon 38) in display area 33 or story (icon 36) in display area 34 of FIG. 3. The description is continued assuming that display area 70 is shown in response to the user selecting media 38 in display area 33 of FIG. 3.

Display area 75 of FIG. 7C is accordingly shown indicating the name "Perspective" of the media (38) selected by the end-user in the user interface of FIG. 3. Display area 76 is shown providing the notes/feedback received from different users for the selected media/content. The feedback is shown in the form of a table having the columns "Notes" indicating the text (or a link to an audio file) of each feedback received from the end-users, "Commented By" indicating the name/identifier of the end-user from whom the feedback was received, and "Posted On" indicting the date and time of providing the feedback. Each of the feedbacks is shown as a corresponding row in the table. For example, row 77 corresponds to the feedback provided by the end-user named Scott using the interface of FIG. 7B.

An end-user by perusing the notes in display area, in enabled to assess the quality of the content collection (or portions thereof) in enhancing content mediated engagements. The end-users may then decide to modify such contents or content collections, if the feedbacks/notes indicate any draw backs/short comings with the currently provided contents or content collections.

Thus, content server 15, in association with client devices 11a and 11c, by providing several aspects of the present invention, enhances content mediated engagements. The manner in which content server 15 may be implemented to provide various aspects of the invention is described below with examples.

13. Example Implementation

Figure 8:
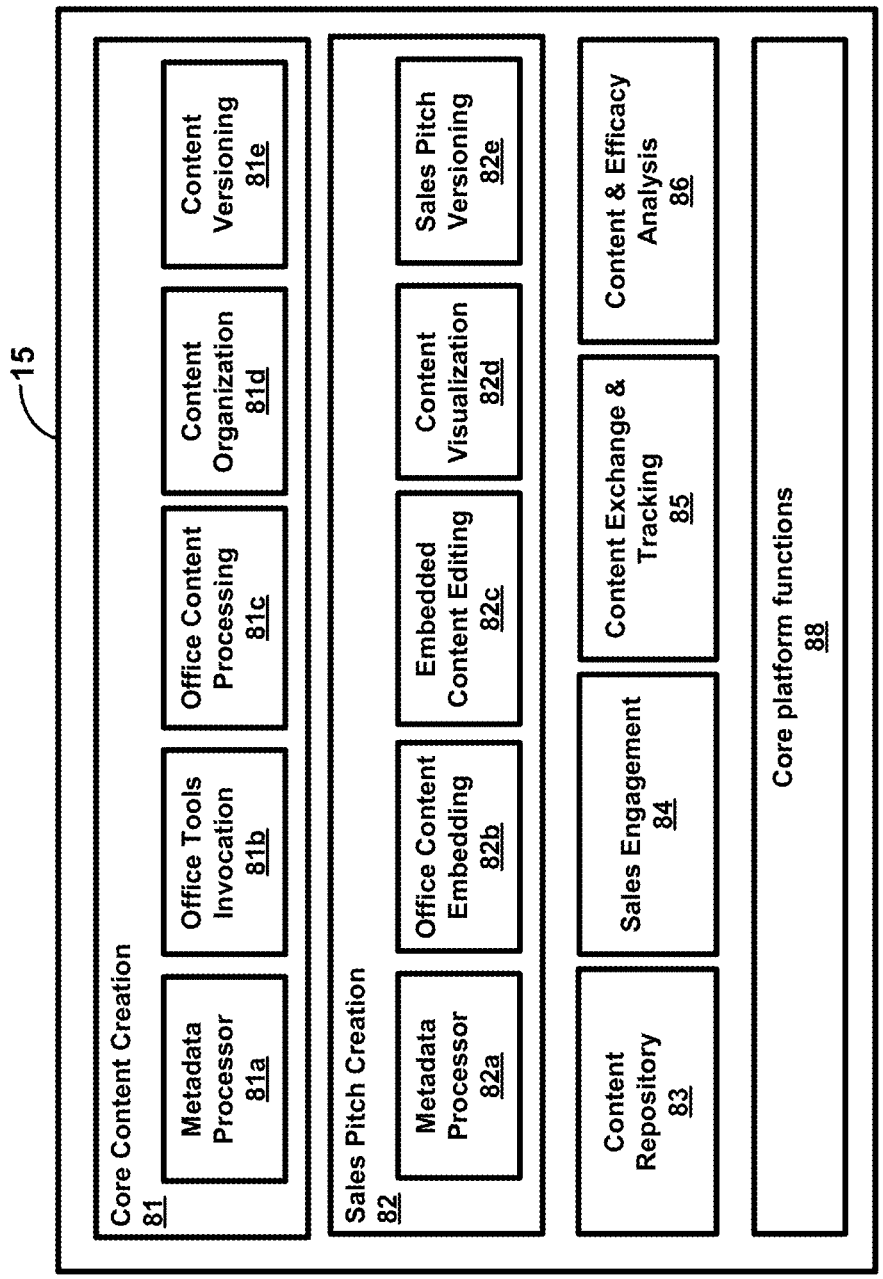
FIG. 8 is a block diagram of a content server, provided according to several aspects of the present invention, in one embodiment.

FIG. 8 is a block diagram of a content server (15), provided according to several aspects of the present invention, in one embodiment. The block diagram is shown containing core content creation 81 (in turn shown containing metadata processor 81a, Office tool invocation 81b, Office content processing 81c, content organization 81d, and content versioning 81e), sales pitch engagement 82 (in turn show containing metadata processor 82a, Office content embedding 82b, embedded content editing 82c, content visualization 82d, and sales pitch versioning 82e), content repository 83, sales engagement 84, content exchange & tracking 85, content & efficacy analysis 86, and core platform functions 88. Each of the blocks of FIG. 8 is described in detail below.

Core content creation block 81 facilitates content developers (using developer system 17) to create interactive content using pre-existing documents/content portion (such as documents of the formats PPT, PDF, DOC, MP3, MPEG, etc. as noted above). Block 81 may accordingly provide web pages based user interface to facilitate content developers to bind several such documents and/or media files into one single 'Custom Media' file. The creators of content collections may later choose from such custom media files as well.

Metadata processor block 81a extracts the metadata associated with each of the content/media (either the standard media files noted above, or developer created custom media). For standard media files, block 81a captures information pertaining to the creation, update and deletion time, media type (e.g. image, video, and audio), and media format (e.g., MP3, MP4, FLV, PNG, JPG). For custom media, block 81a captures/extracts the creation, update and deletion time, custom media type, list of standard media/content used in custom media creation and the structure in which the standard media have been put to create the custom media.

Office tools invocation block 81b facilitates processing of content created using Microsoft Office (hereafter referred to as "Office") available from Microsoft Corporation. Office content processing block 81c facilitates rendering/providing of Office documents in client devices, whose operating systems (for example, iOS™ operating system available from Apple™ Corporation) do not natively support such rendering. Block 81c attempts to overcome this limitation by extracting useful information from Office documents for improved rendering of those documents on such client devices.

Content organization block 81d facilitates users to organize the content in the form of briefcases, as described above with respect to FIG. 3. Such a storage structure is entirely virtualized i.e. the files/document are not 'actually' stored in manner specified by the end-user. Instead, the user specified hierarchy is mapped to underlying storage structures (for example, each briefcase to a folder in a Windows operating system) to create the illusion of such a structure. Such a mapping helps maintain a uniform storage structure independent of the storage repository (18) that is being used for storing the content. Content versioning block 81e provides for editing the uploaded media/content and also tracks the various versions created by such editing of content. Block 81e may provide a strong versioning system through integration with SVN (Subversion™) repositories.

Sales pitch creation block 82 facilitates content end-users (using client devices 11a-11c) to create content collections (stories) using pre-existing standard/custom media provided by content developers. Block 82 facilitates the end-users to create engaging sales presentations using the 'story' feature, noted above. Metadata processor block 82a extracts the information related to the positional relationship and transitions that exist between the various contents (chapters and pages) in each story/content collection.

Office content embedding block 82b determines the manner in which contents of a story are sent to the client devices. As noted above, the content may be embedded in a single file (representing a story) and then sent to the client devices. While embedding contents to the story, documents can be picked from amongst the media that are available on repository 18, or any other media that may be already present in a local non-volatile storage (such as a hard disk) within the client device.

Embedded content editing block 82c performs additional editing on the uploaded (by content developers) content to optimize viewing on the presentation/client device. Some examples of such editing are extracting PowerPoint slides, resizing images, etc. Content visualization block 82d facilitates display of the content on client devices in the same relative layout as is configured for a web page based display of content. Block 82d also enhances the visualizations by using animations, etc. based on the capability of the client device.

Sales pitch versioning block 82e facilitates end-users to edit existing stories/content collections (for example, by providing a web page based interface). The editing can be performed in terms of changing the relative positions of media, or including or excluding media/contents in the sales pitch/story. Block 82e also provides the feature of saving an incomplete 'Story' while still not publishing it to the end-user (such as a sales person). Accordingly, the incomplete story/content collection may be completed in chunks/portions.

Content repository block 83 enables content server to access one or more types of repositories such as cloud based storage services such as Dropbox™, Box.net™, Amazon S3™, etc. Alternatively, block 83 also facilitates access to local storages (such as database/file servers similar to repository 18) located within the premises or managed by the business entity.

Sales engagement block 84 facilitates end users/sales persons (using client devices 11a-11c) to access/view the content collections available on repository 18. The content collection/story may be presented in manual mode (where the user selects from an interface such as that shown in display area 67) and auto-play modes (where the pages/chapters are provided according to the collection sequence). Block 84 also allows the end-user to show an overview of the story (as shown in display area 67). The end-user may also override the order of the contents shown in auto-play mode by switching to the manual mode.

Content exchange & tracking block 85 keeps record of/tracks the shared stories and enables a time-bound access to content within a story. Content & efficacy analysis block 86 keeps detailed tracking of story analytics and integration with sales tools like Salesforce™. Such captured analytics may be related to usage patterns of media/contents within a sales pitch/story, usage frequency of a media in a story, average time spent on presenting a media in a story, most traversed presentation route in a story etc.

Core platform functions block 88 facilitates communications between client devices and other blocks (noted above) of content server 15. Such communication to the server blocks uses REST (Representational State Transfer) web services over HTTP protocol, for fetching metadata. The server sends data in JSON format to the client devices, as noted above. Block 88 may also generate session based URLs to facilitate downloading of media files/contents to the client devices. Such session based URLs may help protect data even in the case of a network breach. Block 88 also provides security for the contents. For example, each end-user may be required to authenticate oneself using previously provided login names and passwords. File security may be maintained on content server 15 and client devices by encrypting stored data and decrypting only at runtime (when necessary to be displayed).

It should be appreciated that the above noted features can be implemented in various embodiments as a desired combination of one or more of hardware, execution modules and firmware. The description is continued with respect to one embodiment in which various features are operative when execution modules are executed.

14. Digital Processing System

Figure 9:
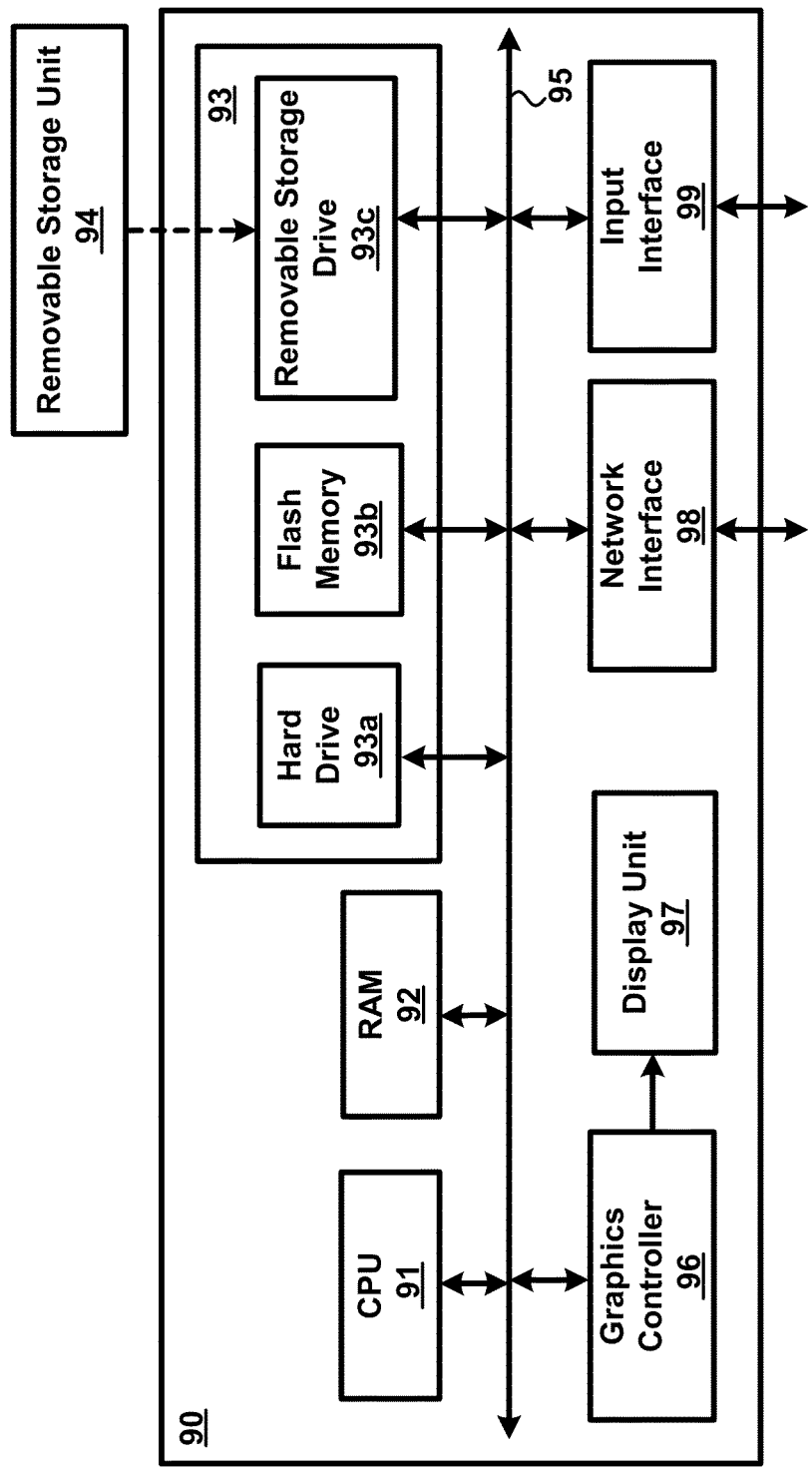
FIG. 9 is a block diagram illustrating the details of a digital processing system in which various aspects of the present invention are operative by execution of appropriate execution modules.

FIG. 9 is a block diagram illustrating the details of digital processing system 90 in which various aspects of the present invention are operative by execution of appropriate execution modules. Digital processing system 90 may correspond to content server 15 or one of client devices 11a-11c.

Digital processing system 90 may contain one or more processors (such as a central processing unit (CPU) 91), random access memory (RAM) 92, secondary memory 93, graphics controller 96, display unit 97, network interface 98, and input interface 99. All the components except display unit 97 may communicate with each other over communication path 95 which may contain several buses as is well known in the relevant arts. The components of FIG. 9 are described below in further detail.

CPU 91 may execute instructions stored in RAM 92 to provide several features of the present invention. CPU 91 may contain multiple processing units, with each processing unit potentially being designed for a specific task. Alternatively, CPU 910 may contain only a single general purpose processing unit. RAM 92 may receive instructions from secondary memory 93 using communication path 95.

Graphics controller 96 generates display signals (e.g., in RGB format) to display unit 97 based on data/instructions received from CPU 91. Display unit 97 contains a display screen to display the images defined by the display signals (e.g. the portions of the user interfaces of FIGS. 3, 4A-4D, 6A-6D and 7A-7C). Input interface 99 may correspond to a keyboard and a pointing device (e.g., touch-pad, mouse), which enable the various inputs to be provided (such as creating of the contents and providing feedback using the user interfaces of FIGS. 3, 4A-4D, 6A-6D and 7A-7C).

Network interface 98 provides connectivity to a network (e.g., using Internet Protocol), and may be used to communicate with other connected systems (e.g. client devices 11a-11c, content server 15, developer system 17, and repository 18 of FIG. 1). Network interface 98 may provide such connectivity over a wire (in the case of TCP/IP based communication) or wirelessly (in the case of WIFI, Bluetooth based communication).

Secondary memory 930 may contain hard drive 93a, flash memory 93b, and removable storage drive 93c. Secondary memory 93 may store the data (e.g., the data portions of FIGS. 5A and 5B,) and software instructions (e.g., for implementing the programming logic of FIG. 2A-2B), which enable digital processing system 90 to provide several features in accordance with the present invention.

Some or all of the data and instructions may be provided on removable storage unit 94, and the data and instructions may be read and provided by removable storage drive 93c to CPU 91. Floppy drive, magnetic tape drive, CD-ROM drive, DVD Drive, Flash memory, removable memory chip (PCM-CIA Card, EPROM) are examples of such removable storage drive 93c.

Removable storage unit 94 may be implemented using storage format compatible with removable storage drive 93c such that removable storage drive 93c can read the data and instructions. Thus, removable storage unit 94 includes a computer readable storage medium having stored therein computer software (in the form of execution modules) and/or data.

However, the computer (or machine, in general) readable storage medium can be in other forms (e.g., non-removable, random access, etc.). These "computer program products" are means for providing execution modules to digital processing system 90. CPU 91 may retrieve the software instructions (forming the execution modules), and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of enhancing content mediated engagements, said method being performed in a content server, said method comprising:

maintaining, in a repository, a plurality of contents that can be used in content mediated engagements, wherein each of said plurality of contents is one of a plurality of types;

enabling a first user to specify a first content collection containing a first set of contents according to a first sequence, said first set of contents including a first content of a first type and a second content of a second type, said first content, said second content and said first set of contents being contained in said plurality of contents, said first type being different from said second type;

storing, in response to said first user specifying, a first data indicating said first content collection;

receiving, from a second user during a content mediated engagement on said first topic with a fifth user, a first request for said first content collection; and providing, in response to said first request, said first set of contents according to said first sequence based on said first data, wherein said providing provides each content of said first set of contents after retrieving the content from said repository, wherein said second user is facilitated to use said first set of contents including said first content of said first type and said second content of said second type during said content mediated engagement with said fifth user;

wherein said first user specifies a first position for said first content in said first sequence, said method further comprising:

enabling a third user to specify a second content collection for a second topic, said second content collection containing a second set of contents according to a second sequence, said second set of contents being contained in said plurality of contents, said second set of contents including said first content of said first type, wherein said third user specifies a second position for said first content in said second sequence, said second position being different from said first position;

storing, in response to said third user specifying, a second data indicating said second content collection;

receiving, from a fourth user during another content mediated engagement on said second topic with a sixth user, a second request for said second content collection; and providing, in response to said second request, said second set of contents according to said second sequence based on said second data, wherein said fourth user is facilitated to use said second set of contents during said another content mediated engagement with said sixth user, wherein said providing provides said first content at said first position in said first sequence in response to said first request, and provides said first content at said second position in said second sequence in response to said second request.

2. The method of claim 1, wherein said maintaining comprises:

receiving, from a content developer, a standard content as said first content and also an indication indicating that said standard content cannot be modified by other users including said first user and said third user; and storing, in response to said receiving, said standard content as said first content in said repository and also said indication, wherein said providing provides, based on said indication, said standard content as said first content in response to both said first request and said second request, wherein said standard content is used by said second user during said content mediated engagement with said fifth user and also by said fourth user during said another content mediated engagement with said sixth user.

3. The method of claim 2, further comprising:

receiving, from said second user and said fourth user, a corresponding feedback on said standard content;

storing, in said repository, the corresponding feedback associated with said standard content; and facilitating said content developer to access the corresponding feedback for said standard content, whereby said content developer is enabled to assess the quality of said standard content in enhancing content mediated engagements.

4. The method of claim 1, wherein said enabling enables said first user to specify a plurality of sub-sequences of said first sequence, each sub-sequence indicating a corresponding subset of contents in said first set of contents that is to be provided before providing the contents corresponding to another sub-sequence, wherein said providing ensures that the corresponding subset of contents of a sub-sequence is provided before providing contents of another sub-sequence.

5. The method of claim 4, wherein said providing provides each of said plurality of sub-sequences and the corresponding subset of contents of each sub-sequence as a multi-dimensional display, wherein said contents of each sub-sequence are provided along a first dimension of said multi-dimensional display, wherein said plurality of sub-sequences are provided along a second dimension of said multi-dimensional display.

6. The method of claim 5, wherein said enabling enables said first user to specify a first set of navigation links for navigating among the contents of a sub-sequence and a second set of navigation links for navigating among said plurality of sub-sequences, wherein said first set of navigation links are displayed along said first dimension of said multi-dimensional display, while said second set of navigation links are displayed along said second dimension of said multi-dimensional display.

7. The method of claim 5, wherein said enabling enables said first user to specify a first transition effect between a pair of contents in a sub-sequence and a second transition effect between a pair of sub-sequences of said plurality of sub-sequences, wherein said providing provides said first transition effect when transitioning from one of said pair of contents to the other of said pair of contents according to said first sequence, wherein said providing provides said second transition effect when transitioning from one of said pair of sub-sequences to the other of said pair of sub-sequences according to said first sequence.

8. The method of claim 1, wherein said enabling further comprises:

receiving, from said first user, a first location in said first content and a third content to be associated with said first location, said third content being contained in said first set of contents, wherein said storing stores as part of said first data, a first association between said first location in said first content and said third content, wherein said providing comprises:

displaying, on a display unit, said first content and an indication at said first location, said indication indicating an association with another content;

receiving, from said second user, an input indicating that said first location in said first content is selected; and providing, to said second user in response to said input, said third content based on said first association stored as part of said first data, wherein said providing provides said third content after retrieving said third content from said repository.

9. A non-transitory machine readable medium storing one or more sequences of instructions for causing a system to enhance content mediated engagements, wherein execution of said one or more sequences of instructions by said one or more processors in said system causes said system to perform the actions of:

maintaining, in a repository, a plurality of contents that can be used in content mediated engagements;

enabling a first user and a third user to respectively specify a first content collection and a second content collection for a first topic, said first content collection being targeted towards a fifth user and said second content collection being targeted towards a sixth user, said first content collection containing a first set of contents according to a first sequence, said second content collection containing a second set of contents according to a second sequence, said first set of contents and said second set of contents being contained in said plurality of contents;

storing, in response to said first user and said third user specifying, a first data indicating said first content collection and a second data indicating said second content collection;

receiving, from a second user during a content mediated engagement on said first topic with said fifth user, a first request for said first content collection;

providing, in response to said first request, said first set of contents according to said first sequence based on said first data, wherein said second user is facilitated to use said first set of contents during said content mediated engagement with said fifth user;

receiving, from a fourth user during another content mediated engagement on said first topic with said sixth user, a second request for said second content collection; and providing, in response to said second request, said second set of contents according to said second sequence based on said second data, wherein said fourth user is facilitated to use said second set of contents during said another content mediated engagement with said sixth user;

wherein said second user, said fourth user, said fifth user and said sixth user are respectively a first sales person, a second sales person, a first customer and a second customer, wherein said content mediated engagement is a first sales engagement between said first sales person and said first customer, and said another content mediated engagement is a second sales engagement between second sales person and said second customer;

wherein said maintaining comprises one or more instructions for:

receiving, from a content developer, a standard content as said first content and also an indication indicating that said standard content cannot be modified by other users including said first user and said third user; and storing, in response to said receiving, said standard content as said first content in said repository and also said indication, wherein said providing provides, based on said indication, said standard content as said first content in response to both said first request and said second request, wherein said standard content is used by said first sales person during said first sales engagement with said first customer and also by said second sales person during said second sales engagement with said second customer.

10. The machine readable medium of claim 9, further comprising one or more instructions for:

receiving, from said first sales person and said second sales person, a corresponding feedback on said standard content;

storing, in said repository, the corresponding feedback associated with said standard content; and facilitating said content developer to access the corresponding feedback for said standard content, whereby said content developer is enabled to assess the quality of said standard content in enhancing sales engagements.

11. The machine readable medium of claim 9, wherein said enabling enables said first user to specify a plurality of sub-sequences of said first sequence, each sub-sequence indicating a corresponding subset of contents in said first set of contents that is to be provided before providing the contents corresponding to another sub-sequence, wherein said providing ensures that the corresponding subset of contents of a sub-sequence is provided before providing contents of another sub-sequence, wherein said providing provides each of said plurality of sub-sequences and the corresponding subset of contents of each sub-sequence as a multi-dimensional display, wherein said contents of each sub-sequence are provided along a first dimension of said multi-dimensional display, wherein said plurality of sub-sequences are provided along a second dimension of said multi-dimensional display.

12. The machine readable medium of claim 9, wherein said enabling further comprises one or more instructions for:

receiving, from said first user, a first location in a first content and a second content to be associated with said first location, said first content and said second content being contained in said first set of contents, wherein said storing stores as part of said first data, a first association between said first location in said first content and said second content, wherein said providing comprises one or more instructions for:

displaying on a display unit, said first content and an indication at said first location, said indication indicating an association with another content;

receiving, from said second user, an input indicating that said first location in said first content is selected; and providing, to said second user in response to said input, said second content based on said first association stored as part of said first data, wherein aid providing provides said second content after retrieving said second content from said repository.

13. A computing system comprising:

a repository to maintain a plurality of contents that can be used in content mediated engagements, wherein each of said plurality of contents is one of a plurality of types;

a plurality of client devices to enable a plurality of users to access said plurality of contents, said plurality of users including a first user and a second user; and a content server operable to:

enable said first user to specify a first content collection for a first topic, said first content collection containing a first set of contents according to a first sequence, said first set of contents including a first content of a first type and a second content of a second type, said first content, said second content and said first set of contents being contained in said plurality of contents, said first type being different from said second type;

store, in response to said first user specifying, a first data indicating said first content collection;

receive, from said second user during a content mediated engagement on said first topic with a fifth user, a first request for said first content collection; and provide, in response to said first request, said first set of contents according to said first sequence based on said first data, wherein said content server provides each content of said first set of contents after retrieving the content from said repository, wherein said second user is facilitated to use said first set of contents including said first content of said first type and said second content of said second type during said content mediated engagement with said fifth user;

wherein said first user specified a first position for said first content in said first sequence, wherein said plurality of users includes a third user and a fourth user, said content server further operable to:

enable said third user to specify a second content collection for a second topic, said second content collection containing a second set of contents according to a second sequence, said second set of contents being contained in said plurality of contents, said second set of contents including said first content of said first type, wherein said third user specifies a second position for said first content in said second sequence, said second position being different from said first position;

store, in response to said third user specifying, a second data indicating said second content collection;

receive, from said fourth user during another content mediated engagement on said second topic with a sixth user, a second request for said second content collection; and provide, in response to said second request, said second set of contents according to said second sequence based on said second data, wherein said fourth user is facilitated to use said second set of contents during said another content mediated engagement with said sixth user, wherein said content server provides said first content at said first position in said first sequence in response to said first request, and provides said first content at said second position in said second sequence in response to said second request.

14. The computing system of claim 13, further comprising:

a developer system to enable a content developer to access said plurality of contents, said content server further operable to:

receive, from said content developer, a standard content as said first content and also an indication indicating that said standard content cannot be modified by other users including said first user and said third user; and store, in response to receiving, said standard content as said first content in said repository and also said indication, wherein said content server provides, based on said indication, said standard content as said first content in response to both said first request and said second request, wherein said standard content is used by said second user during said content mediated engagement with said fifth user and also by said fourth user during said another content mediated engagement with said sixth user.

15. The computing system of claim 13, wherein said content server is further operable to:

receive, from said first user, a first location in said first content and a third content to be associated with said first location, said third content being contained in said first set of contents, wherein said content server stores as part of said first data, a first association between said first location in said first content and said third content, wherein for said providing, said content server is operable to:

display on a display unit, said first content and an indication at said first location, said indication indicating an association with another content;

receive, from said second user, an input indicating that said first location in said first content is selected; and provide, to said second user in response to said input, said third content based on said first association stored as part of said first data, wherein said content server provides said third content after retrieving said third content from said repository.

16. The method of claim 1, wherein each of said plurality of contents is in the form of a file, wherein said plurality of types includes a text file, a presentation file, a document file, a video file, an animation file and an audio file.

\* \* \* \* \*